US010433316B2

(12) United States Patent
Garcia et al.

(10) Patent No.: US 10,433,316 B2
(45) Date of Patent: *Oct. 1, 2019

(54) METHODS USED IN CONTROL NODE AND RADIO NODE AND ASSOCIATED DEVICES

(71) Applicant: Telefonaktiebolaget LM Ericsson (publ), Stockholm (SE)

(72) Inventors: Virgile Garcia, Beijing (CN); Jinhua Liu, Beijing (CN); Qingyu Miao, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/942,436

(22) Filed: Mar. 31, 2018

(65) Prior Publication Data

US 2018/0227926 A1 Aug. 9, 2018

Related U.S. Application Data

(63) Continuation of application No. 15/028,828, filed as application No. PCT/CN2015/082500 on Jun. 26, 2015, now Pat. No. 9,974,086.

(51) Int. Cl.
H04W 72/08 (2009.01)
H04W 72/04 (2009.01)
(Continued)

(52) U.S. Cl.
CPC ............ *H04W 72/082* (2013.01); *H04B 7/04* (2013.01); *H04B 7/0617* (2013.01);
(Continued)

(58) Field of Classification Search
None
See application file for complete search history.

(56) References Cited

U.S. PATENT DOCUMENTS

2010/0039948 A1 2/2010 Agrawal et al.
2011/0021153 A1* 1/2011 Safavi .................. H04B 7/0434
455/63.1
(Continued)

FOREIGN PATENT DOCUMENTS

CN 101601198 A 12/2009
CN 102111844 A 6/2011
(Continued)

OTHER PUBLICATIONS

International Preliminary Report on Patentability for Application No. PCT/CN2015/082500, dated Jan. 4, 2018, 6 pages.
(Continued)

*Primary Examiner* — Peter Chen
*Assistant Examiner* — Jeff Banthrongsack
(74) *Attorney, Agent, or Firm* — Nicholson De Vos Webster & Elliott LLP

(57) ABSTRACT

The present disclosure discloses a method used in a control node and an associated control node. The method includes selecting one or more client radio nodes based on a Directional Link Interference Map (DLIM) for all active links under control of the control node; for each of the selected one or more client radio nodes, determining one or more candidate links between the client radio node and other radio nodes; for each of the determined candidate links and all active links, determining a set of sounding and sensing related parameters; and transmitting the determined set of sounding and sensing related parameters for each of the determined candidate links and all active links to a transmitting node and a receiving node of the link. The present disclosure further discloses a method used in a radio node under control of a control node and an associated radio node.

16 Claims, 12 Drawing Sheets

(51) Int. Cl.
- *H04W 74/08* (2009.01)
- *H04W 36/20* (2009.01)
- *H04L 5/00* (2006.01)
- *H04B 7/04* (2017.01)
- *H04B 7/06* (2006.01)

(52) U.S. Cl.
CPC ......... *H04B 7/0619* (2013.01); *H04L 5/0048* (2013.01); *H04W 72/046* (2013.01); *H04W 36/20* (2013.01); *H04W 74/0808* (2013.01)

(56) References Cited

U.S. PATENT DOCUMENTS

| | | | |
|---|---|---|---|
| 2012/0015664 A1 | 1/2012 | Han et al. | |
| 2012/0033571 A1 | 2/2012 | Shimezawa et al. | |
| 2012/0327914 A1 | 12/2012 | Kang et al. | |
| 2013/0201966 A1* | 8/2013 | Weng .................. | H04W 72/04 370/336 |
| 2013/0223268 A1 | 8/2013 | Jung et al. | |
| 2013/0273833 A1 | 10/2013 | Wang et al. | |
| 2013/0336176 A1 | 12/2013 | Rubin et al. | |
| 2014/0177449 A1 | 6/2014 | Novak et al. | |
| 2014/0198766 A1* | 7/2014 | Siomina .............. | H04W 72/082 370/330 |
| 2014/0315490 A1 | 10/2014 | Hughes et al. | |
| 2014/0328264 A1 | 11/2014 | Merlin et al. | |
| 2015/0264652 A1 | 9/2015 | Zhang et al. | |
| 2017/0111914 A1 | 4/2017 | Chen et al. | |

FOREIGN PATENT DOCUMENTS

| | | |
|---|---|---|
| CN | 102611527 A | 7/2012 |
| CN | 102624465 A | 8/2012 |
| CN | 103378935 A | 10/2013 |
| CN | 103563409 A | 2/2014 |
| CN | 103813347 A | 5/2014 |
| CN | 104584666 A | 4/2015 |
| CN | 104871597 A | 8/2015 |
| EP | 2424137 A1 | 2/2012 |
| JP | 2003258812 A | 9/2003 |
| JP | 2010021642 A | 1/2010 |
| JP | 2013509071 A | 3/2013 |
| RU | 2432581 C1 | 10/2011 |
| RU | 2526886 C2 | 8/2014 |
| RU | 2013120077 A | 11/2014 |
| WO | 2012167184 A2 | 12/2012 |
| WO | 2014036150 A1 | 3/2014 |
| WO | 2014047773 A1 | 4/2014 |
| WO | 2014058282 A1 | 4/2014 |
| WO | 2014075287 A1 | 5/2014 |
| WO | 2014124164 A1 | 8/2014 |
| WO | 2014133311 A1 | 9/2014 |
| WO | 2016095084 A1 | 6/2016 |

OTHER PUBLICATIONS

International Preliminary Report on Patentability for Application No. PCT/CN2016/087042, dated Jan. 4, 2018, 6 pages.
International Search Report and the Written Opinion for Application No. PCT/CN2015/082500, dated Mar. 14, 2016, 12 pages.
International Search Report and Written Opinion for Application No. PCT/CN2016/087042, dated Sep. 21, 2016, 12 pages.
Notice of Allowance from U.S. Appl. No. 15/028,828, dated Jan. 11, 2018, 17 pages.
Communication pursuant to Rules 70(2) and 70a(2) EPC for Application No. 16813745.3, dated Jan. 8, 2019, 1 page.
Extended European Search Report for Application No. 16813743.8, dated Jan. 4, 2019, 11 pages.
Extended European Search Report for Application No. 16813745.3, dated Dec. 11, 2018, 8 pages.
International Preliminary Report on Patentability for Application No. PCT/CN2015/082516, dated Jan. 4, 2018, 6 pages.
International Preliminary Report on Patentability for Application No. PCT/CN2016/087045, dated Jan. 4, 2018, 6 pages.
International Preliminary Report on Patentability for Application No. PCT/CN2015/082519, dated Jan. 4, 2018, 6 pages.
International Preliminary Report on Patentability for Application No. PCT/CN2016/087047, dated Jan. 4, 2018, 6 pages.
International Search Report and Written Opinion for Application No. PCT/CN2015/082516, dated Mar. 24, 2016, 11 pages.
International Search Report and Written Opinion for Application No. PCT/CN2015/082519, dated Mar. 31, 2016, 11 pages.
International Search Report and Written Opinion for Application No. PCT/CN2016/087045, dated Aug. 29, 2016, 11 pages.
International Search Report and Written Opinion for Application No. PCT/CN2016/087047, dated Sep. 22, 2016, 11 pages.
Non-Final Office Action from U.S. Appl. No. 15/028,864, dated Nov. 30, 2017, 32 pages.
Notice of Allowance from U.S. Appl. No. 15/028,620, dated Mar. 16, 2018, 8 pages.
Notice of Allowance from U.S. Appl. No. 15/028,864, dated Jun. 19, 2018, 13 pages.
Notice of Reasons for Rejection from foreign counterpart Japanese Patent Application No. 2017-567194, dated Jan. 8, 2019, 6 pages.
Notice of Reasons for Rejection from foreign counterpart Japanese Patent Application No. 2017-567248, dated Dec. 11, 2018, 4 pages.
Office Action and Search Report from foreign counterpart Russian Patent Application No. 2018102801, dated Oct. 9, 2018, 8 pages (translation available only for office action).
Office action and Search Report from foreign counterpart Russian Patent Application No. 2018102889, dated Nov. 13, 2018, 10 pages.
Office Action from foreign counterpart Japanese Patent Application No. 2017-561665, dated Nov. 30, 2018, 4 pages.
Preliminary Rejection for Korean Application No. 10-2018-7002156, dated Jan. 8, 2019, 4 pages.
Sony, "SRS Reception and Configuration Enhancement in TDD," 3GPP TSG RAN WG1 Meeting #80 bis, R1-151785 Apr. 20-24, 2015, pp. 1-4.
ZTE, "Discussion on SRS Enhancements," 3GPP TSG RAN WG1 Meeting #81, R1-152983, May 25-29, 2015, pp. 1-5.

* cited by examiner

METHODS USED IN CONTROL NODE AND RADIO NODE AND ASSOCIATED DEVICES

CROSS-REFERENCE TO RELATED APPLICATIONS

This application is a continuation of U.S. application Ser. No. 15/028,828, filed Apr. 12, 2016, which is a National stage of International Application No. PCT/CN2015/082500, filed Jun. 26, 2015, which are hereby incorporated by reference.

TECHNICAL FIELD

The technology presented in this disclosure generally relates to the technical field of wireless communication networks. More particularly, the present disclosure relates to a method used in a control node and the associated control node, and to a method used in a radio node under control of a control node and the associated radio node.

BACKGROUND ART

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Currently, wireless communication networks or systems, such as MilliMeter-Wave (MMW) wireless systems, operating at high frequencies from 30-300 GHz, are emerging as a promising technology to meet exploding bandwidth requirements by enabling multi-Gb/s speeds. For example, the 5th Generation (5G) network is likely to be a combination of evolved 3rd Generation (3G) technologies, the 4th Generation (4G) technologies and emerging or substantially new components such as Ultra-Density Network (UDN), which is also referred to as MMW Radio Access Technology (RAT). At such high frequencies, a large number of antennas can be available at a transmitter, a receiver, or both. In order to make up for the large propagation loss that typically occurs, beam-forming becomes a very important feature in MMW wireless systems.

Beam-forming is a signal processing technique used for directional signal transmission and/or reception. For Transmitter (TX) beamforming, the signals are concentrated in the desired direction via applying a selected precoding vector for the TX antenna array. For Receiver (RX) beamforming, the RX beam of the receiver antennas are concentrated in the incoming direction of the radio signals by applying a selected precoding vector for the RX antenna array. Beam-forming can be used at both the transmitting and receiving ends in order to achieve spatial selectivity. The improvement compared with omnidirectional reception/transmission is known as a beam-forming gain. When multiple antennas are available at transmitters, receivers or both, it is therefore important to apply efficient beam patterns to the antennas to better exploit the spatial selectivity of the corresponding wireless channel.

FIG. 1 schematically shows one example MMW RAT network. As shown in FIG. 1, there is a network node or a control node called as Central Control Unit (CCU), which is at least responsible for parameter configurations and coordination among Access Nodes (ANs), e.g., AN1, AN2, AN3, and AN4.

Typically, received power in a receiver side of a link can be expressed as:

$$P_{rx} = P_{TX} \cdot G_{TX} \cdot G_{RX} \left(\frac{r}{4\pi\lambda}\right)^2 \cdot e^{-\alpha r}$$

where PTX is transmitted power from a transmitter side of a link, GTX and GRX are beamforming gains of transmitting and receiving antennas, respectively, $\lambda$ is the wavelength, and a is the attenuation factor due to absorption in the medium. For an MMW-wave link at 60 GHz, oxygen absorption loss can be as high as 16 dB/km.

From the above formula, it is clear that the attenuation of radio wave is proportional to $1/\lambda^2$. With the same propagation distance, 60 GHz attenuates 29.5 dB more compared to 2 GHz, without considering the oxygen absorption.

In considering this, high gain beam-forming is mandatory in order to compensate the extra attenuation. Thanks to the small wavelength, more antenna elements can be integrated in the antenna panel with the same size. This makes it possible to reach a higher beam-forming gain. However, if there are several tens or several hundreds of antenna elements, one Radio Frequency (RF) chain (either TX RF chain or RX RF chain) for each antenna element is inapplicable due to unacceptable cost. In such a case, multiple antenna elements share one RF chain and a specific analog phase adjustment is applied for each antenna in order to adjust the beam direction and maximize the beam-forming gain. Due to the narrow TX beam, it is needed to steer transmission of beacon signals to enable AN discovery area, and to preform beam-forming training to maximize the beam-forming gain.

Meanwhile, high gain beam-forming could bring challenges, including, e.g., hidden problem and deafness problem. Those problems will be described in detail hereafter.

FIG. 2 illustrates an example of the hidden problem caused by directivity of high gain beam-forming. As shown in FIG. 2, link pair 1 is composed by Access Point 1 (AP1) and User Equipment 1 (UE1), and link pair 2 is composed by AP2 and UE2. When AP2 is transmitting to UE2, neither AP 1 or UE 1 can detect the channel utilized by AP2 and UE2 because both AP1 and UE1 are outside of the TX beam coverage from AP2 to UE2. However, when AP1 transmits data to UE1, its TX beam can reach UE2 and cause interference.

FIG. 3 illustrates an example of the deafness problem caused by directivity of high gain beam-forming. As shown in FIG. 3, UE 1 and AP1 compose link pair 1 and UE2 and AP2 compose link pair 2. The link pair 2 has ongoing data transmission from AP2 to UE2. But this is not detected by UE1 because UE1 does not monitor (or sense) this direction. However, when UE 1 starts data transmission, the data receiving by UE2 can be clearly impacted due to UE1 and UE2 are close to each other.

Currently, it is supposed that the total carrier bandwidth of the MMW-RAT can be up to 1 or 2 GHz. This bandwidth can be composed by a number of sub-band carriers of a certain bandwidth, e.g. 100 MHz. By way of example, FIG. 4 illustrates one MMW-RAT carrier with 4 sub-bands. The smallest resource grid in FIG. 4 corresponds to a sub-band in the frequency domain and to a subframe in the time domain, and may be referred to as a sounding and sensing resource element. Of course, the sounding and sensing resource element may be also in terms of code.

To allocate the available resources, a contention based resource allocation scheme and/or a scheduling based resource allocation scheme may be applied in MMW-RAT as the basic policy of collision avoidance. A contention based resource allocation scheme provides a mechanism to compete for the channel based on the self-determination on the channel availability. In a scheduling based resource allocation scheme, a scheduler, e.g., a CCU as shown in FIG. 1, gains the resource controllability first via either contention based method or coordination method first and allocates the resource to controlled links.

There could be certain combination of the contention based resource allocation scheme and the scheduling based resource allocation scheme. FIG. 5 illustrates an example of a complex interference situation in a MMW-RAT network. As shown in FIG. 5, due to directivity of high gain beam-forming, Link 1 and Link 2 may have unendurable UpLink (UL) to DownLink (DL) interference while Link 5 and Link 6 may have unendurable DL to DL interference and UL to DL interference.

Due to directivity of high gain beam-forming, the collision determination is more complex than omni-transmission. The traditional measurement does not work well due to the aforementioned deafness and hidden problems. Besides, though carrier sensing methods commercially used in Wireless Local Area Network (WLAN, 802.11) and Wireless Personal Area Network (WPAN, 802.15) are developed, they are mainly for local access system. It is a distributed carrier sensing scheme, i.e., the carrier sensing is done by each node pair independently. For MMW RAT, firstly it is expected that there can be better dimensioned deployment involving multiple nodes of APs and UEs, and better network controllability (e.g., self-optimization, self-organization, and mobility) than Wireless Fidelity (WiFi) is targeted. Secondly, MMW RAT is expected to provide much better Quality of Service (QoS) than WiFi. In this sense, a better measurement than simple distributed carrier sensing of WiFi is desired.

The interference measurements in 3G and 4G wireless systems are mainly designed to measure the inter-cell/inter-Transmission-Point interference, rather than inter-link interference. Due to small sector size and the large overlapping coverage in case of MMW RAT, the similar measurement as 3G or 4G systems is not enough to identify links in collision and help the interference management.

SUMMARY

It is in view of the above considerations and others that the various embodiments of the present technology have been made. To be specific, aiming to at least some of the above defects, the present disclosure proposes to align directional sounding and sensing parameters for all links under control of a CCU, thereby facilitating interference measurements.

According to a first aspect of the present disclosure, there is proposed a method used in a control node. The method includes: selecting one or more client radio nodes based on a Directional Link Interference Map (DLIM) for all active links under control of the control node. Each of the one or more client radio nodes is served by a server radio node under control of the control node. There is an active link between each of the one or more client radio nodes and its server radio node. The method further includes: for each of the selected one or more client radio nodes, determining one or more candidate links between the client radio node and other radio nodes. The one or more candidate links are other than an active link between the client radio node and its server radio node. One of the one or more candidate links have possibilities to be established for replacing the active link. The method further includes: for each of the determined candidate links and all active links under control of the control node, determining a set of sounding and sensing related parameters. The determined set of sounding and sensing related parameters includes a set of dedicated sounding and sensing related parameters for the link and a set of common sounding and sensing related parameters for all of the determined candidate links and all active links under control of the control node. The set of common sounding and sensing related parameters includes a sounding and sensing period and a sounding and sensing interval. The method further includes: transmitting the determined set of sounding and sensing related parameters to a transmitting node and a receiving node of each link.

Preferably, selecting one or more client radio nodes based on the DLIM for all active links includes at least one of: selecting a first client radio node if an interference from an active link of the first client radio node to an active link of a second client radio node exceeds a first predetermined threshold; selecting the first client radio node if a ratio between an interference strength from the active link of the first client radio node to a signal strength of the active link of the second client radio node exceeds a second predetermined threshold; selecting the first client radio node if an interference from the active link of the first client radio node to the active link of the second client radio node exceeds a third predetermined threshold, and a radio quality of the active link of the second client radio node is lower than a fourth predetermined threshold.

Preferably, selecting one or more client radio nodes based on the DLIM for all active links comprises at least one of: selecting a client radio node, if an experienced interference by an active link of the client radio node exceeds a fifth predetermined threshold; selecting a client radio node if a SNR or SINR of the active link of the client radio node falls below a sixth predetermined threshold; selecting the client radio node if the SNR or SINR of the active link of the client radio node falls below the sixth predetermined threshold and the experienced interference by the active link of the client radio node exceeds the fifth predetermined threshold.

Preferably, selecting one or more client radio nodes based on the DLIM for all active links includes: receiving a selection of a client radio node from its server radio node when traffic load of the server radio node exceeds a seventh predetermined threshold.

Preferably, selecting one or more client radio nodes based on the DLIM for all active links includes: selecting a client radio node, if traffic load of a server radio node serving the client radio node exceeds traffic load of one neighboring radio node of the server radio node.

Preferably, the set of common sounding and sensing related parameters further includes: a rule for the receiving node reporting, to the control node, its result of sensing sounding signals.

Preferably, the set of dedicated sounding and sensing related parameters for the link include a sounding resource parameter for specifying a resource unit for the transmitting node transmitting a sounding signal, the specified resource unit being in terms of at least one or more of: time, frequency, and code.

Preferably, the method further includes: receiving one or more results of sensing sounding signals from all receiving nodes of all of the determined candidate links and all active links under control of the control node; determining an extended DLIM based on the received one or more sensing results; and for one client radio node among the selected one or more client radio nodes, selecting one new active link from corresponding one or more candidate links of the client radio node based on the determined extended DLIM.

Preferably, selecting one new active link includes: building one or more sets of links based on the determined extended DLIM, one of the one or more sets of links have possibilities to be used for replacing a current set of active links; evaluating a performance metric on each of the selected one or more sets of links and the current set of active links; and selecting one set of links having the best performance metric as new active links.

Preferably, building one or more sets of links based on the determined extended DLIM includes: replacing one or more active links among the current set of active links with one or more candidate links to build one set of the one or more sets of links.

Preferably, building one or more sets of links based on the determined extended DLIM includes: removing one or more active links from the current set of active links to build one set of the one or more sets of links.

Preferably, building one or more sets of links based on the determined extended DLIM includes: adding one or more candidate links into the current set of active links to build one set of the one or more sets of links.

According to a second aspect of the present disclosure, there is proposed a method used in a radio node under control of a control node. The radio node serves a client radio node. The method includes: determining one or more candidate links between the client radio node and another radio nodes. The one or more candidate links are other than an active link between the client radio node and the radio node. One of the one or more candidate links have possibilities to be established for replacing the active link. The method further includes: transmitting, to the control node, an indication for indicating the determined one or more candidate links; and receiving, from the control node, sounding and sensing related parameters for each of the active link and the determined one or more candidate links. The received sounding and sensing related parameters include dedicated sounding and sensing related parameters for the link and common sounding and sensing related parameters for all of the determined one or more candidate links and all active links under control of the network. The common sounding and sensing related parameters include a sounding and sensing period and a sounding and sensing interval. The method further includes: for each of the active link and the determined one or more candidate links, sensing all sounding signals in a direction of the link based on the received sounding and sensing related parameters and reporting one or more sensing results to the control node, when the radio node serves as a receiving node of the link.

Preferably, the method further includes: receiving, from the client radio node, measurements on one or more neighboring radio nodes of the radio node. The one or more candidate links are determined based on the received measurements.

Preferably, the one or more candidate links are determined based on a position of the client radio node.

Preferably, the common sounding and sensing related parameters further include: a rule for the radio node reporting the one or more results of sensing sounding signals to the control node when the radio node serves as a receiving node of the link.

Preferably, the method further includes: for each of the active link and the determined one or more candidate links, transmitting a sounding signal in a direction of the link based on the sounding and sensing related parameters, when the radio node serves as a transmitting node of the link.

Preferably, the dedicated sounding and sensing related parameters for each of the active link and the determined one or more candidate links include a sounding resource parameter for specifying a resource unit for the radio node transmitting the sounding signal, the specified resource unit being in terms of at least one or more of: time, frequency and code.

According to a third aspect of the present disclosure, there is proposed a control node. The control node includes a first selecting unit configured to select one or more client radio nodes based on a DLIM for all active links under control of the control node. Each of the one or more client radio nodes is served by a server radio node under control of the control node, and there is an active link between each of the one or more client radio nodes and its server radio node. The control node further includes a first determining unit configured to determine, for each of the selected one or more client radio nodes, one or more candidate links between the client radio node and other radio nodes. The one or more candidate links are other than an active link between the client radio node and its server radio node, and one of the one or more candidate links have possibilities to be established for replacing the active link. The control node further includes a second determining unit configured to determine, for each of the determined candidate links and all active links under control of the control node, a set of sounding and sensing related parameters, wherein the determined set of sounding and sensing related parameters includes a set of dedicated sounding and sensing related parameters for the link and a set of common sounding and sensing related parameters for all of the determined candidate links and all active links under control of the control node. The set of common sounding and sensing related parameters includes a sounding and sensing period and a sounding and sensing interval. The control node further includes a transmitting unit configured to transmit the determined set of sounding and sensing related parameters for each of the determined candidate links and all active links to a transmitting node and a receiving node of the link.

According to a fourth aspect of the present disclosure, there is proposed a radio node under control of a control node. The radio node serves a client radio node. The radio node includes a determining unit configured to determine one or more candidate links between the client radio node and another radio nodes. The one or more candidate links are other than an active link between the client radio node and the radio node, and one of the one or more candidate links have possibilities to be established for replacing the active link. The radio node further includes a transmitting unit configured to transmit, to the control node, an indication indicating the determined one or more candidate links. The radio node further includes a receiving unit configured to receive, from the control node, sounding and sensing related parameters for each of the active link and the determined one or more candidate links. The received sounding and sensing related parameters include dedicated sounding and sensing related parameters for the link and common sounding and sensing related parameters for all of the determined one or more candidate links and all active links under control of the network. The common sounding and sensing related parameters include a sounding and sensing period and a sounding and sensing interval. The radio node further includes a sensing unit configured to sense, for each of the active link and the determined one or more candidate links, all sounding signals in a direction of the link based on the received sounding and sensing related parameters and reporting one or more sensing results to the control node, when the radio node serves as a receiving node of the link.

According to a fifth aspect of the present disclosure, there is proposed a computer program product storing instructions that when executed, cause one or more computing devices to perform the method of either of the first and second aspects.

By aligning directional sounding and sensing parameters for all links under control a control node, e.g., in an MMW network, including not only active links but also one or more candidate links that have possibilities to be established for replacing the active links, receiving nodes of the all links may be in a directional sensing state when their corresponding transmitting nodes are sending directional sounding signals. This facilitates interference measurement within an aligned window, thereby improving interference measurement efficiency while efficiently achieving spatial reuse benefit inherited from high gain beamforming.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Herein, an active link here refers to a link actually established between a client radio node and its server radio node. For example, in the Long Term Evolution (LTE) system, when a UE successfully accesses to an enhanced Node B (eNB), it can be said that there is an active link established between the UE and the eNB. Such an active link may be UL or DL. A candidate link for an active link refers to a potential link that has possibilities to be established for replacing the active link and has not been established yet. A transmitting node of a candidate link may transmit its sounding signal in a direction of the candidate link to the corresponding receiving node, but there is no real link established between the transmitting node and the receiving node.

Hereinafter, a link refers to an active link for simplification, unless otherwise explicitly indicated as a candidate link.

First of all, the present disclosure proposes to align directional sounding and sensing parameters (this solution may be referred to as Aligned Directional Sounding and Sensing (ADSS) hereinafter) for links, e.g., in an MMW RAT network.

To be specific, the present disclosure configures a transmitter of each link pair (i.e., link transmitter and receiver) with a time-frequency radio resource pattern to send directional sounding beam in its link direction, and correspondingly configures a receiver of each link pair with the same time-frequency radio resource pattern to directionally monitor all possible sounding signals in its link directions. Thereby, receivers of all link pairs may be in a directional sensing state when their corresponding transmitters are sending directional sounding signals. In this way, the victim link pairs and the interfering link pairs can be accurately identified and the mutual interference levels can be measured. That is, an effective inter-link interference map (also referred to as DLIM) of an MMW RAT network can be derived. Such measurement information can be used to enhance the resource allocation schemes, e.g., time, frequency and transmit power resource.

Figure 6:
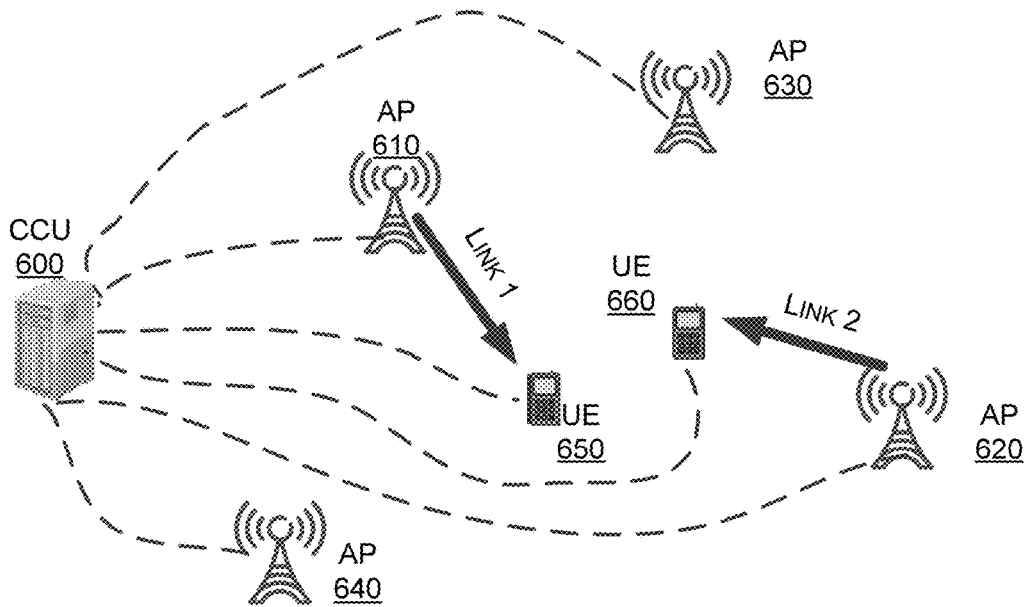
FIG. 6 depicts an example of a wireless communication network in which embodiments herein may be implemented.

FIG. 6 depicts an example of a wireless communication network in which ADSS may be implemented. The wireless communication network comprises a Central Control Unit (CCU) 600 and a plurality of radio nodes (also referred to as access nodes (ANs)) whereof six ANs are depicted in FIG. 6. The CCU 600 may be a Node B, a Base Station (BS), an eNB, an eNodeB, an Home Node B, an Home eNode B, a relay node, an AP or any other control node or network node at least responsible for parameter configurations and coordination among ANs as well as controlling radio links among ANs, in any wireless system or cellular network, such as an LTE network, any 3rd Generation Partnership Project (3GPP) cellular network, an MWV network, a Wimax network, a WLAN/Wi-Fi, a WPAN etc. Each radio node may e.g., be a wireless device, a mobile wireless terminal or a wireless terminal, a mobile phone, a computer such as a laptop, a Personal Digital Assistants (PDAs) or a tablet computer, sometimes referred to as a phablet, with wireless capability (the foregoing ones may be collectively known as a UE), a sensor or actuator with wireless capabilities or any other radio network units capable to communicate over a radio link in a wireless communication network. It should be noted that the term "radio node" or "AN" used in this document also covers other wireless devices such as Machine to Machine (M2M) devices, also denoted Machine Type Communication (MTC) devices. In this example, four ANs are exemplified as APs, i.e., AP 610, AP 620, AP 630, and AP 640, and two ANs are exemplified as UEs, i.e., UE 650 and UE 660. Furthermore, each AN can be regarded as either a transmitting node or a receiving node in different radio links. For example, in a link on which AP 610 transmits data to UE 650, AP 610 is a transmitting node, and UE 650 is a receiving node. In contrast, in a link on which AP 610 receives data from UE 650, AP 610 is a receiving node, and UE 650 is a transmitting node. To put it differently, a radio node or an AN may be either a client radio node or a server radio node, depending on its role. For example, if a radio node is UE 660 as shown in FIG. 6, AP 620 serves its server radio node. It is also possible that a UE may play a role of a server radio node when the UE serves as a hot point and serves other UEs. In this case, the server radio node is the UE, and client radio nodes may be other UEs served by the UE.

Figure 7:
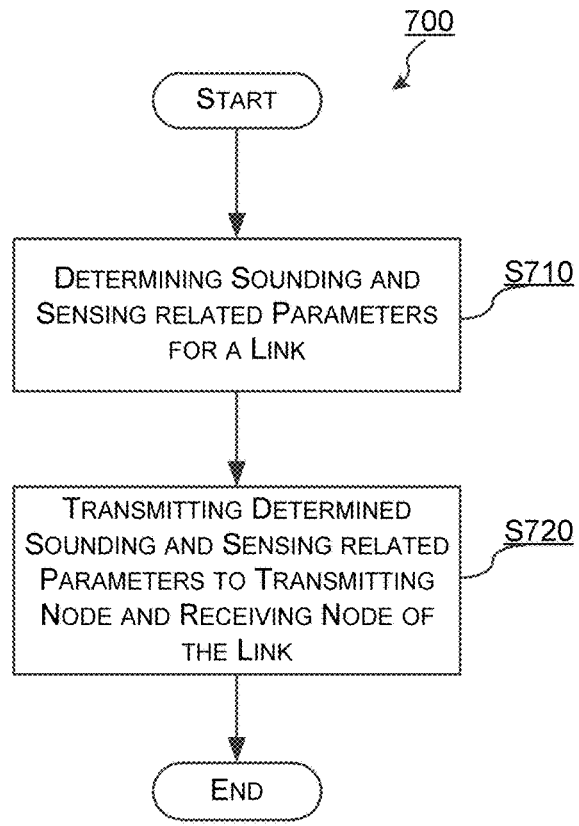
FIG. 7 shows a flowchart of a method 700 performed in a control node according to embodiments of the present disclosure.

FIG. 7 shows a flowchart of a method 700 performed in a control node, e.g., CCU 600 in FIG. 6, according to embodiments of the present disclosure. To be specific, the method 700 is used for implementing ADSS at network side.

At step S710, the control node determines sounding and sensing related parameters for a link, e.g., a radio link between AP 610 and UE 650 as shown in FIG. 6. The determined sounding and sensing related parameters include dedicated sounding and sensing related parameters for the link and common sounding and sensing related parameters for all links controlled by the control node. The common sounding and sensing related parameters include a sounding and sensing period and a sounding and sensing interval (i.e., a duration for sounding and sensing).

As a feasible implementation, the control node may determine the sounding and sensing related parameters upon receipt of a setup request for the link from, e.g., either end of the link, e.g., AP 610 or UE 650, etc.

At step S720, the control node transmits the determined sounding and sensing related parameters to a transmitting node and a receiving node of the link. For example, the transmitting node is AP 610 and the receiving node is UE 650, as shown in FIG. 6.

In an implementation, the common sounding and sensing related parameters may further include: a rule for the receiving node reporting its sensing result to the control node.

In another implementation, the dedicated sounding and sensing related parameters for the link may include a sounding resource parameter for specifying a sounding resource element for the transmitting node transmitting a sounding signal. The specified sounding resource element is in terms of at least one or more of: time, frequency, and code.

In another implementation, the method 700 may further include the following steps (not shown) of: receiving one or more sensing results from all receiving nodes of all links under control of the control node; determining a DLIM based on the received one or more sensing results; and determining a resource allocation scheme or a resource allocation strategy for data transmission in all links controlled by the control node based on the determined DLIM.

One major advantage with the method 700 is receiving nodes of all link pairs may be in a directional sensing state when the transmitting nodes of their neighboring links are sending directional sounding signals. This enables one link to identify all interfering links and measure the interference level from these interfering links, based on which the network can efficiently improve spatial reuse of frequency resources while avoiding and/or controlling collisions among different links.

Figure 8:
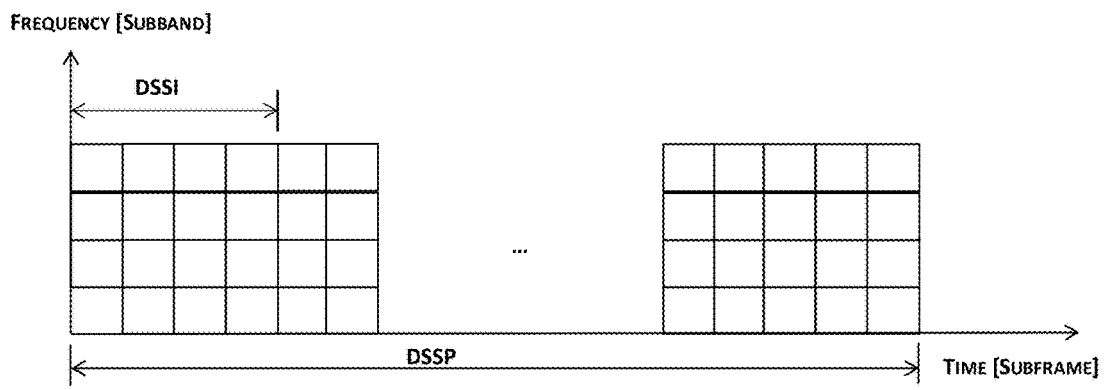
FIG. 8 illustrates a general sounding and sensing resource allocation structure according to embodiments of the present disclosure.

FIG. 8 illustrates a general sounding and sensing resource allocation structure according to embodiments of the present disclosure.

As shown in FIG. 8, Directional Sounding and Sensing Period (DSSP) denotes a sounding and sensing period, and Directional Sounding and Sensing Interval (DSSI) denotes a sounding and sensing interval, i.e., a window/a duration for sounding and sensing. The DSSP and DSSI are common sounding and sensing related parameters for all links controlled by the control node, and may be determined by the control node.

Figure 1:
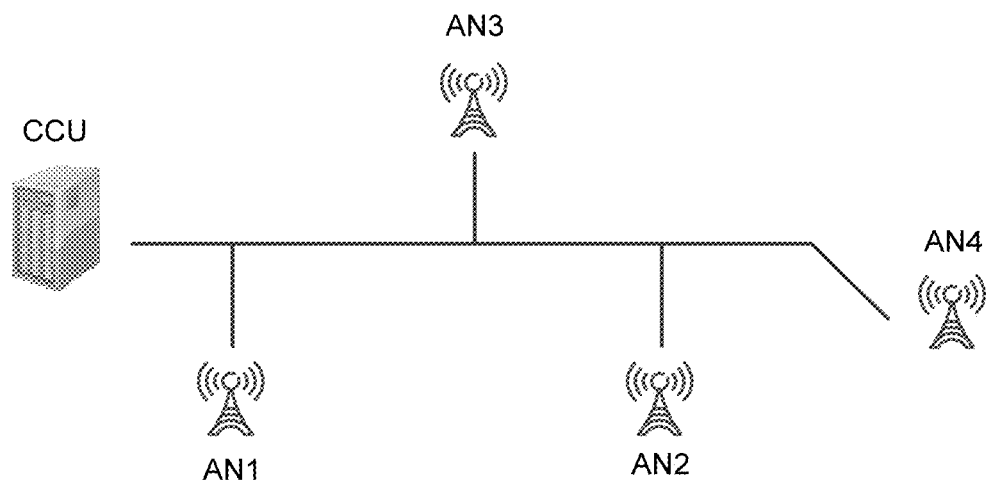
FIG. 1 schematically shows one example MMW RAT network.
Figure 2:
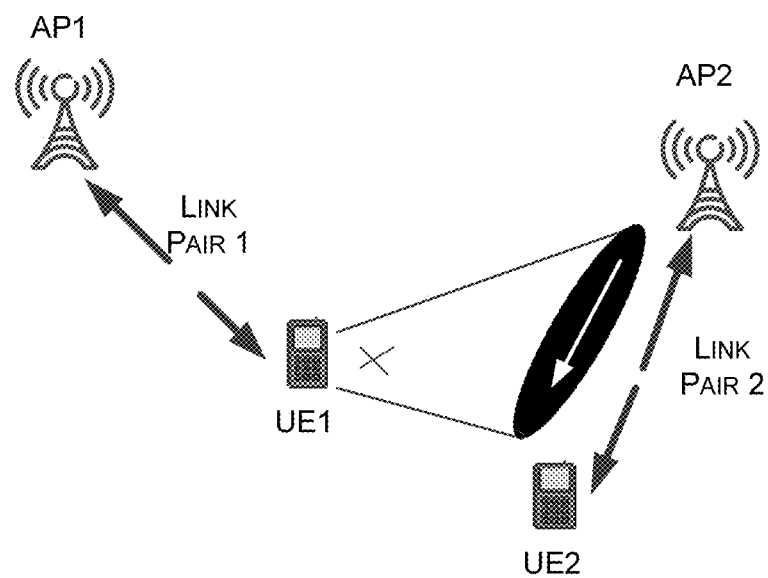
FIG. 2 illustrates an example of the hidden problem caused by directivity of high gain beam-forming.
Figure 3:
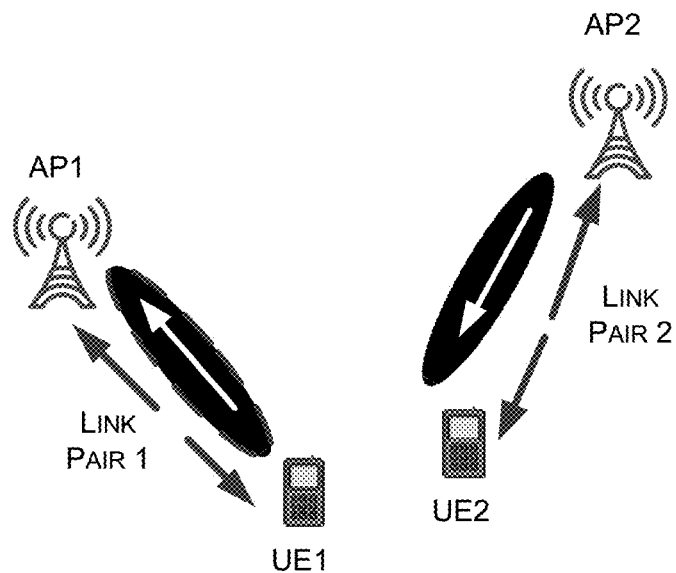
FIG. 3 illustrates an example of the deafness problem caused by directivity of high gain beam-forming.
Figure 4:
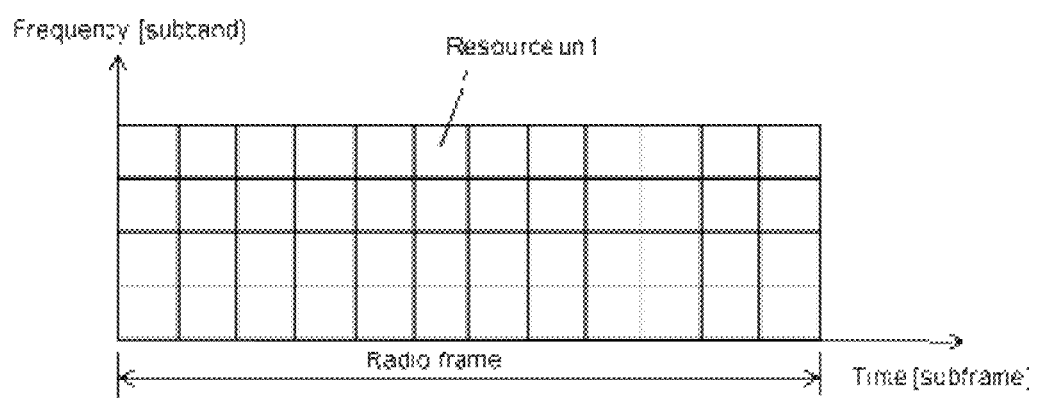
FIG. 4 illustrates one MMW-RAT carrier with 4 sub-bands.
Figure 5:
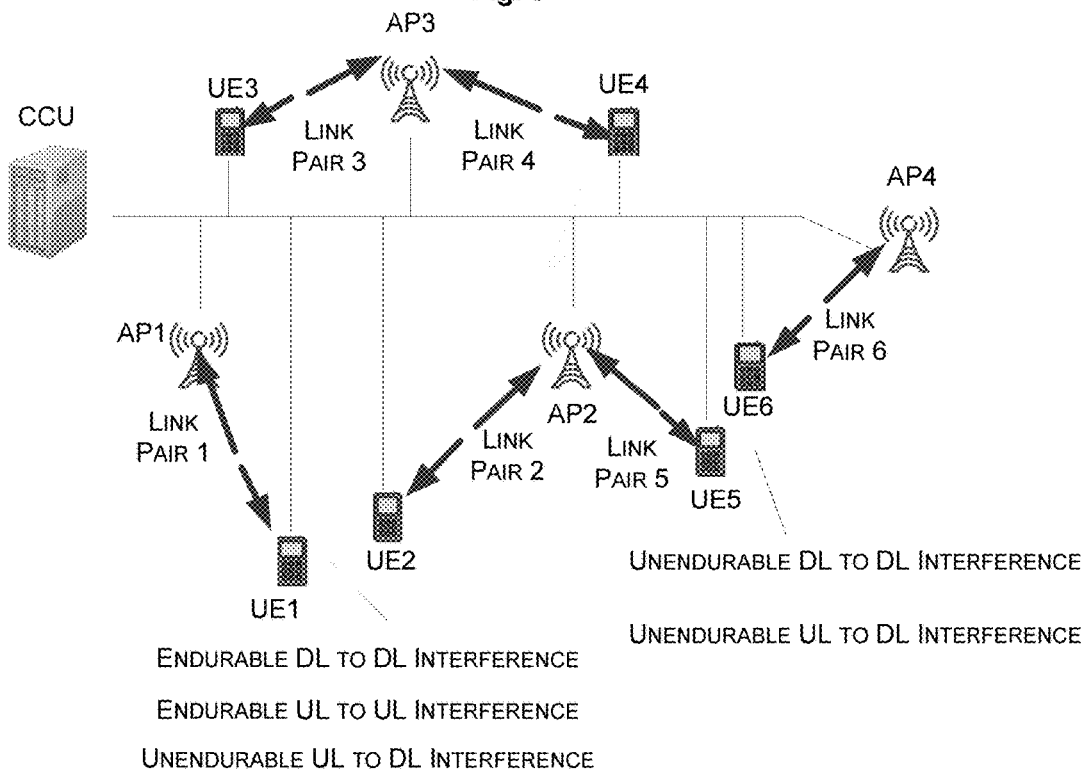
FIG. 5 illustrates an example of a complex interference situation in a MMW-RAT network.

The DSSP and DSSI are mainly in terms of time domain. For example, the DSSP and DSSI both refer to time windows. In this case, a transmitting node of each link may transmit a sounding signal to a receiving node of the link in a direction of the link during a time window defined by the DSSI, and the receiving node senses all sounding signals in a direct of the link during the same time window. Thereby, inter-link interferences, e.g., DL-DL interference between link 5 and link 6 as shown in FIG. 5, can be sensed in an efficient manner.

Optionally, the DSSP and DSSI may be further in terms of frequency domain. For example, the DSSI may further define one or more sub-bands to be used by the transmitting node/the receiving node of the link.

Within the DSSI, there are a number of sounding and sensing resource elements, some of which are allocated to a link for transmitting a sounding signal by means of dedicated sounding and sensing related parameters and thus are called as Sounding Resource Units (SRUs). One sounding and sensing resource element may be defined in terms of at least one or more of: time, frequency, and code. For example, one sounding and sensing resource element may be defined as one time-frequency resource unit plus an orthogonal sequence. This means that multiple sounding signals may be multiplexed over one time-frequency unit by using orthogonal sequences.

In practice, the DSSI length may be determined based on the link density in the network and the DSSP length may be short enough to track the TX/RX beam change of link pairs, including both TX/RX direction change and TX power change.

An exemplary DLIM may be described by referring to FIG. 5. As shown in FIG. 5, the DLIM can indicate the received sounding signal power from the transmitter of each link (Link i, e.g., any one of links 1-6 as shown in FIG. 5) and the received sounding signal strengths from other links whose sounding signals are detected by the link (Link i) receiver.

The DLIM may identify whether a transmitter of a first link contributes considerable interference to a receiver of a second link. If there is considerable interference contributed, the interference level and the corresponding link identity are included in the DLIM. Relying the sounding signals (SRU) and corresponding signal strengths reported from a receiver, the control node can identify the links and corresponding interference levels to the receiver.

For example, the DLIM may be updated upon receipt of a new directional sounding report from a receiver, or upon link setup/link release.

With such DLIM, the present disclosure can enhance the radio resource allocation (e.g. time, frequency and TX power resource), so that the spatial reuse can be efficiently and sufficiently improved.

Figure 9:
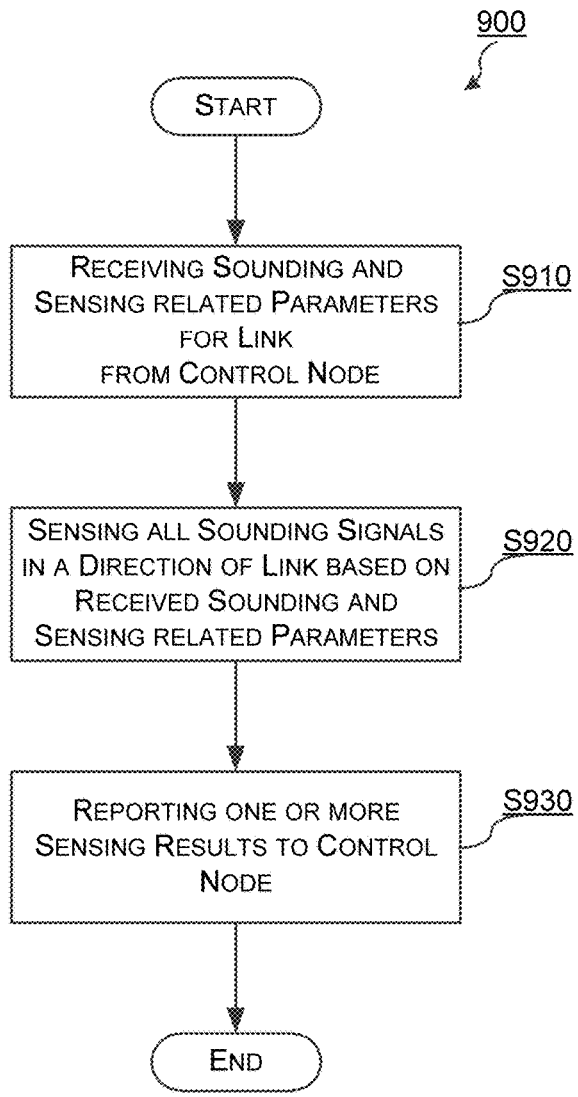
FIG. 9 shows a flowchart of a method 900 performed in a receiving node of a link according to embodiments of the present disclosure.

FIG. 9 shows a flowchart of a method 900 performed in a receiving node of a link, such as a radio link between AP 610 and UE 650 as shown in FIG. 6, according to embodiments of the present disclosure. To be specific, the method 900 is used for performing ADSS at receiving side. In this case, the receiving node may be AP 610 or UE 650. For illustration, UE 650 is taken as the receiving node here, and correspondingly AP 610 serves as a corresponding transmitting node for the receiving node, and vice versa.

At step S910, UE 650 receives sounding and sensing related parameters for the link from a control node, e.g., the CCU 600 in FIG. 6. The received sounding and sensing related parameters include dedicated sounding and sensing related parameters for the link and common sounding and sensing related parameters for all links controlled by the control node. The common sounding and sensing related parameters include a sounding and sensing period and a sounding and sensing interval.

At step S920, UE 650 senses all sounding signals in a direction of the link based on the received sounding and sensing related parameters.

At step S930, UE 650 reports one or more sensing results to the control node.

In an implementation, the common sounding and sensing related parameters further include: a rule for UE 650 reporting the one or more sensing results to the control node.

During the sounding interval, all receiving nodes shall be in blindly monitoring state in its link direction. Each receiving node shall target its RX beam in an incoming direction of its link. In order to leave some room for the RX beam adjustment during one sounding period, the RX beam for directional sensing could be wider than the RX beam for actual data receiving.

Via blind detection, the receiving node may determine information on SRU of the detected sounding signals. This information shall be reported to the control node for possible interfering transmitter identification. Moreover, the receiving node may further measure the strength of each detected sounding signal. This measurement result shall be reported to the CCU to derive the DLIM, which can be used to determine the maximum allowed TX power for a transmitter or interference coordination pattern in order to control the interference.

Figure 10:
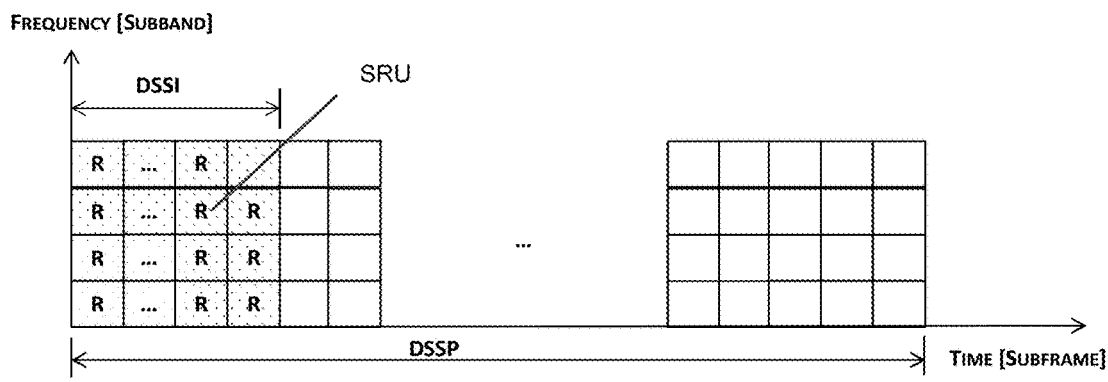
FIG. 10 illustrates an example sensing resource allocation structure according to embodiments of the present disclosure.

FIG. 10 illustrates an example sensing resource allocation structure according to embodiments of the present disclosure. As shown in FIG. 10, each receiving node may sense all possible sounding signals in its link direction over all SRUs during the DSSI.

One major advantage with the method 900 is that the receiving node can sense all sounding signals in a direction of the link in a time window during which the transmitting nodes of the neighboring links are transmitting sounding signals. When the method 900 is applied in two neighboring links, interference between these two links can be sensed in an efficient manner.

Figure 11:
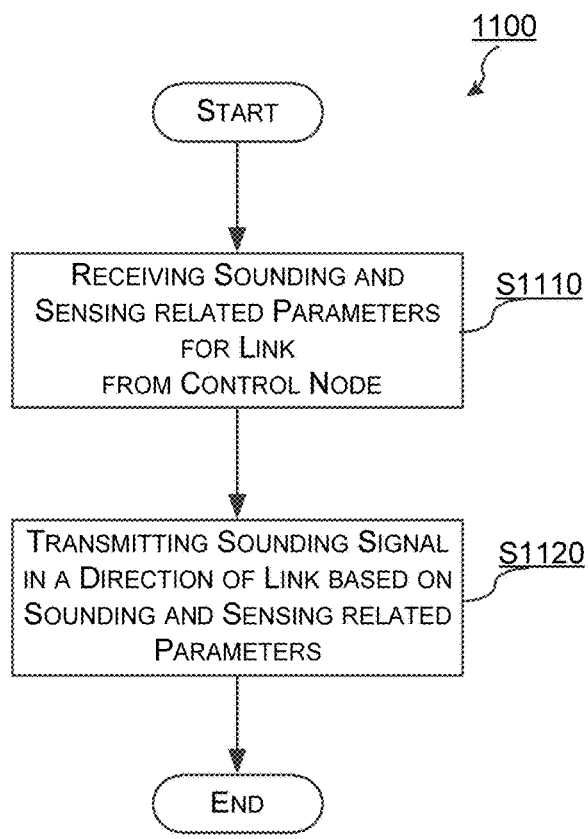
FIG. 11 shows a flowchart of a method 1100 performed in a transmitting node of a link according to embodiments of the present disclosure.

FIG. 11 shows a flowchart of a method 1100 performed in a transmitting node of a link, such as a radio link between AP 610 and UE 650 as shown in FIG. 6, according to embodiments of the present disclosure. To be specific, the method 1100 is used for performing ADSS at transmitting side. In this case, the transmitting node may be AP 610 or UE 650. For illustration, AP 610 is taken as the transmitting node here, and correspondingly UE 650 serves as a corresponding receiving node for the transmitting node, and vice versa.

At step S1110, AP 610 receives sounding and sensing related parameters for the link from a control node, e.g., the CCU 600 as shown in FIG. 6. The received sounding and sensing related parameters include dedicated sounding and sensing related parameters for the link and common sounding and sensing related parameters for all links controlled by the control node. The common sounding and sensing related parameters include a sounding and sensing period and a sounding and sensing interval, e.g., DSSP and DSSI as shown in FIG. 8.

At step S1120, AP 610 transmits a sounding signal in a direction of the link based on the sounding and sensing related parameters.

In an implementation, the dedicated sounding and sensing related parameters for the link include a sounding resource parameter for specifying a sounding resource element for the transmitting node transmitting the sounding signal. The specified resource unit is in terms of at least one or more of: time, frequency and code.

Figure 12:
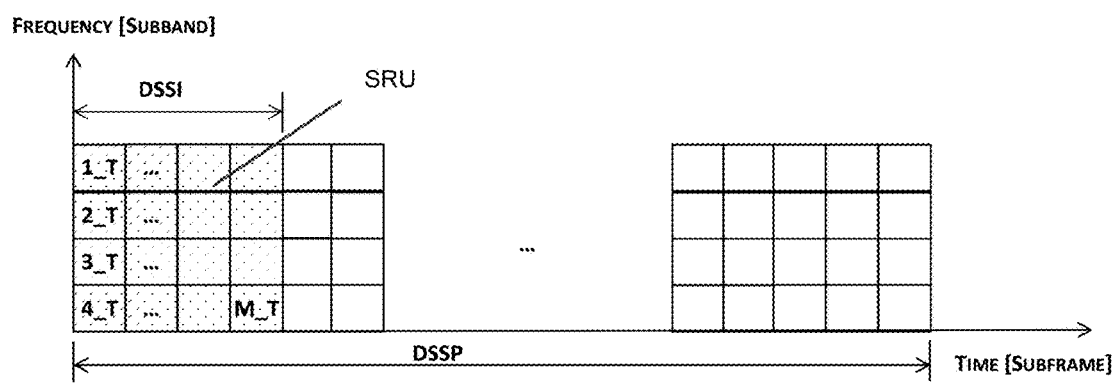
FIG. 12 illustrates an example sounding resource allocation structure according to embodiments of the present disclosure.

FIG. 12 illustrates an example sounding resource allocation structure according to embodiments of the present disclosure.

As shown in FIG. 12, each transmitting node may be allocated with one SRU, and there are totally M transmitters controlled by the control node, e.g., the CCU 600 as shown in FIG. 6. Optionally, each SRU may be also defined in terms of frequency. For example, each SRU may occupy one sub-band.

One major advantage with the method 1100 is that the transmitting node can transmit a sounding signal in a direction of the link in a time window during which the receiving nodes of itself and its neighboring links are sensing the sounding signal. When the method 1100 is applied in two neighboring links, interference between these two links can be sensed in an efficient manner.

Figure 13:
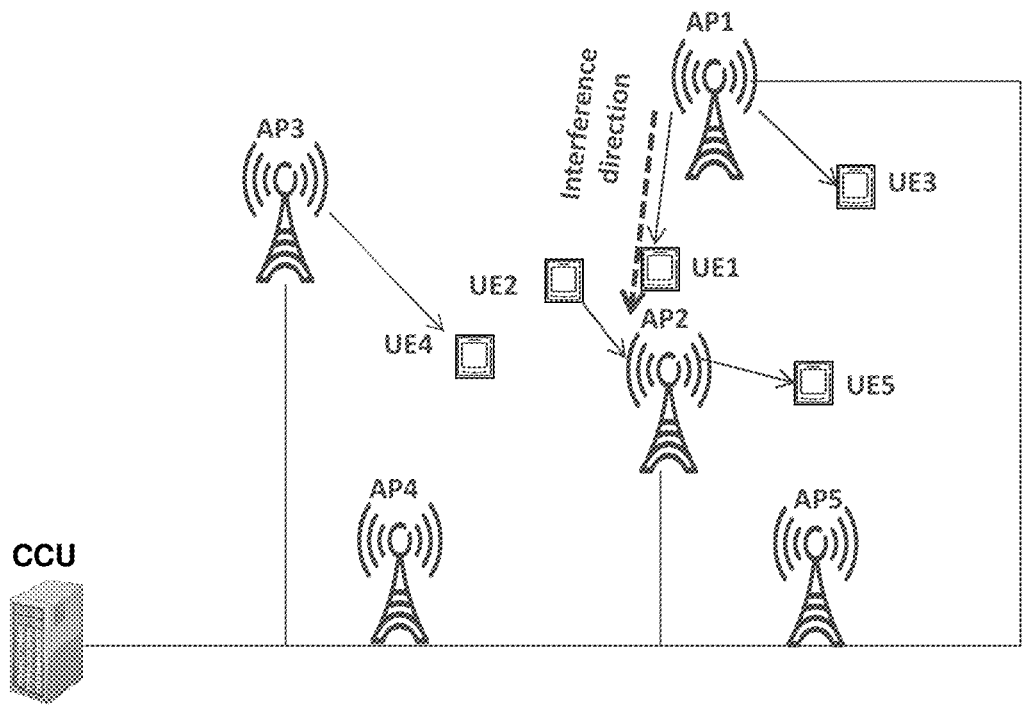
FIG. 13 shows a diagram illustrating an exemplary DLIM according to the present disclosure.

FIG. 13 shows a diagram illustrating an exemplary DLIM according to the present disclosure. For example, the DLIM may be determined by a CCU such as CCU 600 in FIG. 6 using the method 700.

It is assumed that there are five active links under control of CCU. Under such an assumption, the DLIM is determined for these five active links. As shown in FIG. 13, the DLIM identifies that the link from UE2 to AP2 experiences strong interference from APE When a UE's link (either UL or DL) is identified as an interfering link to another link or as a victim link of another link, spatial direction change (i.e., adjusting spatial reusing) is one promising method to mitigate the interference in case of high gain beamforming. This is especially true for super density network where the neighboring APs have high ratio of overlapped coverage. This provides the good feasibility to adjust spatial direction change when necessary.

However, the spatial direction change may result in unpredictable interference situation. With the above concept of ADSS, ADSS is only performed for active links. But, for an active link, there may be one or more candidate links that have possibilities to be established for replacing the links. The ADSS cannot allow the network to derive the interference situation (interference to others and/or from others) for such candidate links.

Aiming to such issues, the present disclosure further proposes to extend the above ADSS to support interference aware spatial directional change for spatial reuse optimization. Hereinafter, the extended ADSS may be referred to as extended (or improved) ADSS.

The basic idea of the extended ADSS lies in:
1) ADSS can be performed for both active links and candidate links if possible;
2) An extended DLIM is derived to include both the interference situation of all the active links and the predicted interference situation of all the candidate links; and
3) One or more preferred candidate links may be selected to replace one or more active links of a UE based on the extended DLIM when there is considerable interference to/from another link.

With the extended DLIM, some optimal links can be determined according to certain predefined rules for spatial reuse.

Figure 14:
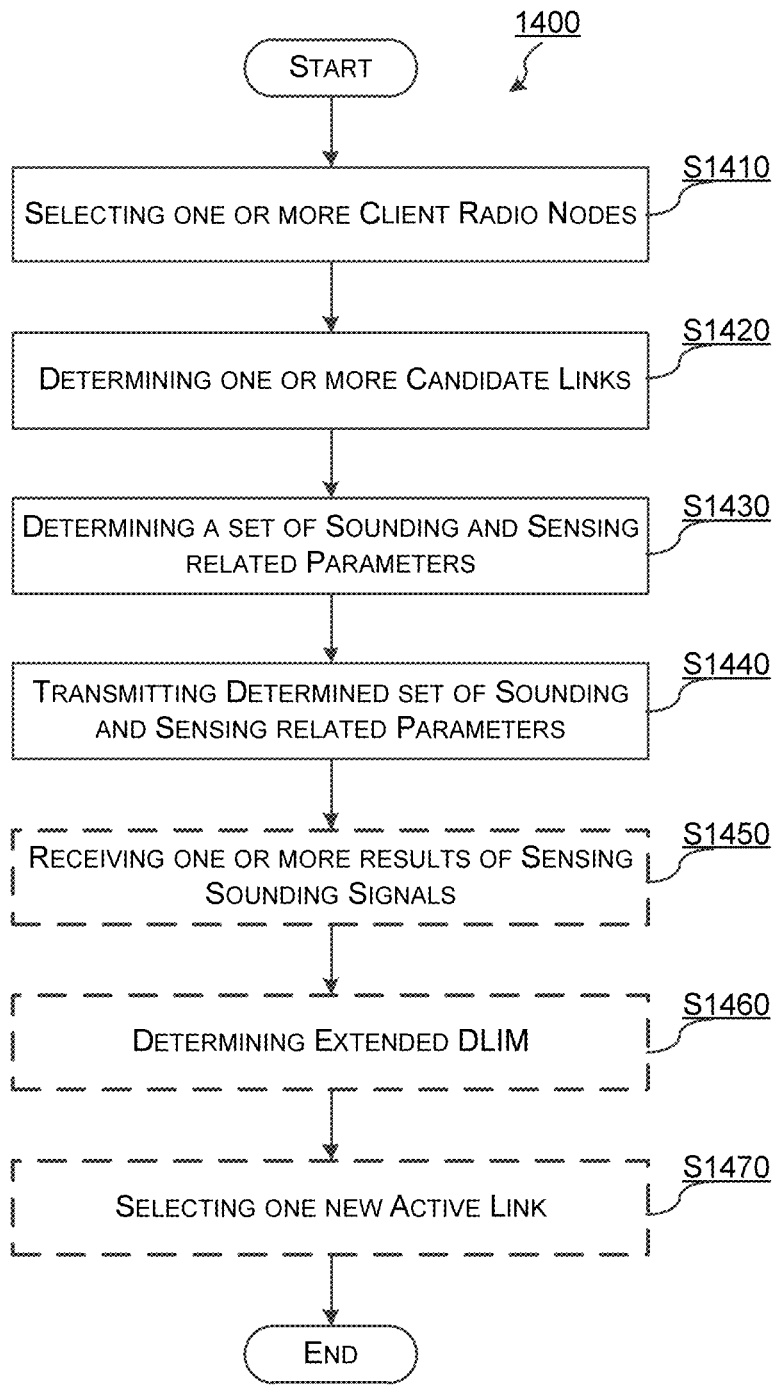
FIG. 14 shows a flowchart of a method 1400 used in a control node according to embodiments of the present disclosure.

FIG. 14 shows a flowchart of a method 1400 used in a control node, e.g., e.g., CCU 600 in FIG. 6, according to embodiments of the present disclosure. To be specific, the method 1400 is used for implemented the extended ADSS at network side.

The control node controls a server radio node that serves one or more client radio nodes. The server radio node may be, e.g., any AN as depicted in FIG. 6. For example, if a client radio node is UE 660, then the server radio node is AP 620. It is also possible that a UE plays a role of a server radio node, when the UE serves as a hot point and serves other UEs. Taking UE 660 as shown in FIG. 6 as an example, in this case, UE 660 may be a server radio node, and other UEs served by UE 660 may be client radio nodes. To put it differently, the server radio node here may be either a transmitting node or a receiving node of a link, either an active link or a candidate link.

At step S1410, the control node selects one or more client radio nodes based on a DLIM for all active links under control of the control node. Each of the one or more client radio nodes is served by a server radio node under control of the control node, and there is an active link between each of the one or more client radio nodes and its server radio node. It should be noted that the DLIM here is intended for all active links under control of the control node. As an example, the DLIM here may be determined by the method 700 according to the present disclosure.

For example, the DLIM may be the DLIM as illustrated in FIG. 13. In such an example, the control node (i.e., CCU as illustrated) may select any of client radios nodes such as UE1, UE2, UE3, UE4 or UE5 based on the interference situation identified by the DLIM.

There are various criteria available for selecting client radio nodes for the extended ADSS. Several exemplary implementations will be described for illustration. It would be appreciated that the present disclosure is not limited thereto.

In a first implementation, step S1410 may be implemented by selecting a first client radio node if an interference from an active link of the first client radio node to an active link of a second client radio node exceeds a first predetermined threshold. For example, in the scenario as shown in FIG. 13, if the DLIM identifies that an interference from an active link of UE2 to an active link of UE5 exceeds the first predetermined threshold, UE2 may be selected for the extended ADSS.

In a second implementation, step S1410 may be implemented by selecting the first client radio node if a ratio between an interference strength from the active link of the first client radio node to a signal strength of the active link of the second client radio node exceeds a second predetermined threshold. Still taking FIG. 13 as an example, if the DLIM identifies that a ratio between an interference strength from the active link of UE2 to a signal strength of the active link of UE5 exceeds the second predetermined threshold, UE2 may be selected for the extended ADSS.

In a third implementation, step S1410 may be implemented by selecting the first client radio node if an interference from the active link of the first client radio node to the active link of the second client radio node exceeds a third predetermined threshold, and a radio quality of the active link of the second client radio node is lower than a fourth predetermined threshold. Still taking FIG. 13 for illustration, if the DLIM identifies that an interference from the active link of UE2 to the active link of UE5 exceeds the third predetermined threshold, and a radio quality of the active link of UE5 is lower than the fourth predetermined threshold, UE2 may be selected for the extended ADSS.

In a fourth implementation, step S1410 may be implemented by selecting a client radio node, if an experienced interference by an active link of the client radio node exceeds a fifth predetermined threshold. Taking FIG. 13 as an example, if an experienced interference by the active link from UE2 to AP2 exceeds the fifth predetermined threshold, UE2 may be selected for the extended ADSS.

In a fifth implementation, step S1410 may be implemented by selecting a client radio node if a SNR or SINR of the active link of the client radio node falls below a sixth predetermined threshold. Taking FIG. 13 as an example, if a SNR or SINR of the active link from UE2 to AP2 falls below the sixth predetermined threshold, UE2 may be selected for the extended ADSS.

In a sixth implementation, step S1410 may be implemented by selecting the client radio node if the SNR or SINR of the active link of the client radio node falls below the sixth predetermined threshold and the experienced interference by the active link of the client radio node exceeds the fifth predetermined threshold. Still taking FIG. 13 as an example, if a SNR or SINR of the active link from UE2 to AP2 falls below the sixth predetermined threshold and an experienced interference by the active link from UE2 to AP2 exceeds the fifth predetermined threshold, UE2 may be selected for the extended ADSS.

In a seventh implementation, step S1410 may be implemented by receiving a selection of a client radio node from its server radio node when traffic load of the server radio node exceeds a seventh predetermined threshold. In the scenario of FIG. 13, for example, if AP2 identifies that traffic load of UE2 exceeds the seventh predetermined threshold, AP2 may select UE2 and reports it to CCU for the extended ADSS.

In an eighth implementation, step S1410 may be implemented by selecting a client radio node, if traffic load of a server radio node serving the client radio node exceeds traffic load of one neighboring radio node of the server radio node. Still taking FIG. 13 as an example, if CCU identifies that traffic load of AP2 exceeds traffic load of AP2's one neighboring radio node, such as AP3 or AP4, CCU may select UE2 for the extended ADSS.

It should be noted that any of the first to the seventh thresholds may be preconfigured at the network side or at the radio node side.

At step S1420, the control node determines, for each of the selected one or more client radio nodes, one or more candidate links between the client radio node and other radio nodes. It is also possible that the candidate links are determined at the radio node side, which will be described later.

Figure 15:
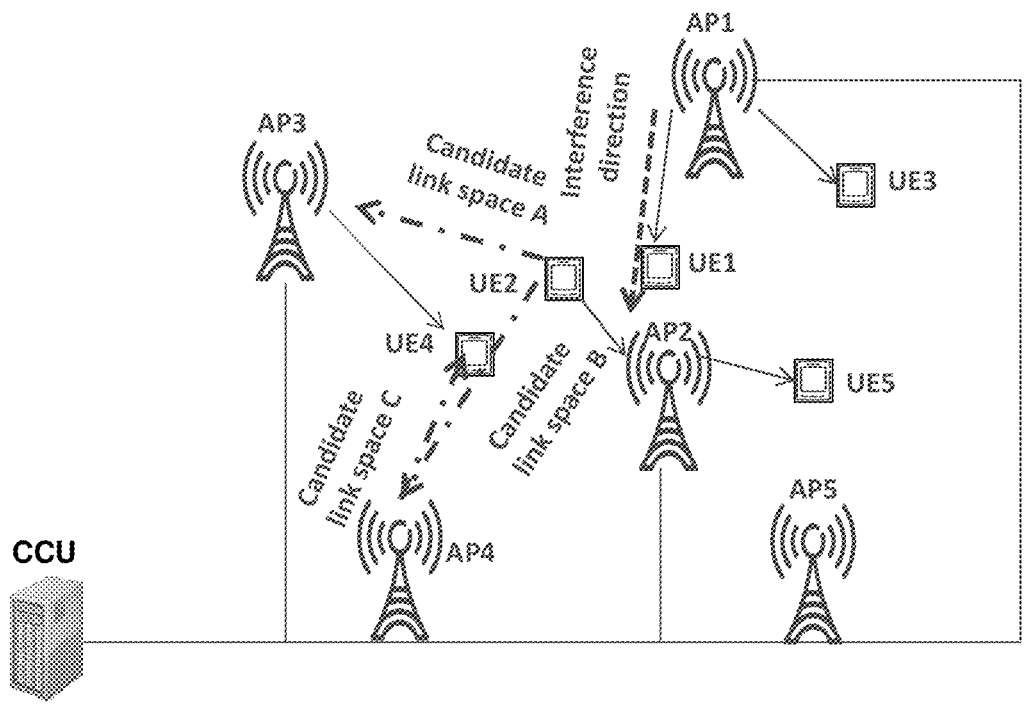
FIG. 15 illustrates an exemplary scenario in which several candidate links are determined according to the present disclosure.

FIG. 15 illustrates an exemplary scenario in which several candidate links are determined according to the present disclosure.

As shown in FIG. 15, UE2 has been selected for the extended ADSS. Then, the control node determines two candidate links, i.e., a candidate link from UE2 to AP3 and a candidate link from UE2 to AP4, for replacing the active link from UE2 to AP2.

As another example, UE4 has been selected for the extended ADSS. In this case, the control node may determine one candidate link, i.e., a candidate link from AP4 to UE4, for replacing the active link from AP3 to UE4.

At step S1430, the control node applies the extended ADSS for all active links and all the determined candidate links. Step S1430 mainly differs from step S710 in that the latter focuses on active links while the former is directed to not only active links but also candidate links.

To be specific, the control node determines, for each of the determined candidate links and all active links under control of the control node, a set of sounding and sensing related parameters. The determined set of sounding and sensing related parameters includes a set of dedicated sounding and sensing related parameters for the link and a set of common sounding and sensing related parameters for all of the determined candidate links and all active links under control of the control node. The set of common sounding and sensing related parameters includes a sounding and sensing period and a sounding and sensing interval (i.e., a duration for sounding and sensing). For example, the sounding and sensing related parameters may be illustrated by FIG. 10 and/or FIG. 12. Then, the sounding and sensing period may be denoted as DSSP and the sounding and sensing interval may be indicated by DSSI.

In an implementation, the set of dedicated sounding and sensing related parameters for the link comprise a sounding resource parameter for specifying a resource unit for the transmitting node transmitting a sounding signal, the specified resource unit being in terms of at least one or more of: time, frequency, and code. For example, the specified resource unit here may be SRU as shown in FIG. 10 or FIG. 12.

At step S1440, the control node transmits the determined set of sounding and sensing related parameters for each of the determined candidate links and all active links to a transmitting node and a receiving node of the link.

Optionally, the method 1400 may further include steps S1450-S1470. At step S1450, the control node receives one or more results of sensing sounding signals from all receiving nodes of all the determined candidate links and all active links under control of the control node. At step S1460, the control node determines an extended DLIM based on the received one or more sensing results. At step S1470, the control node selects, for one client radio node among the selected one or more client radio nodes, one new active link from corresponding one or more candidate links of the client radio node based on the determined extended DLIM.

Figure 16:
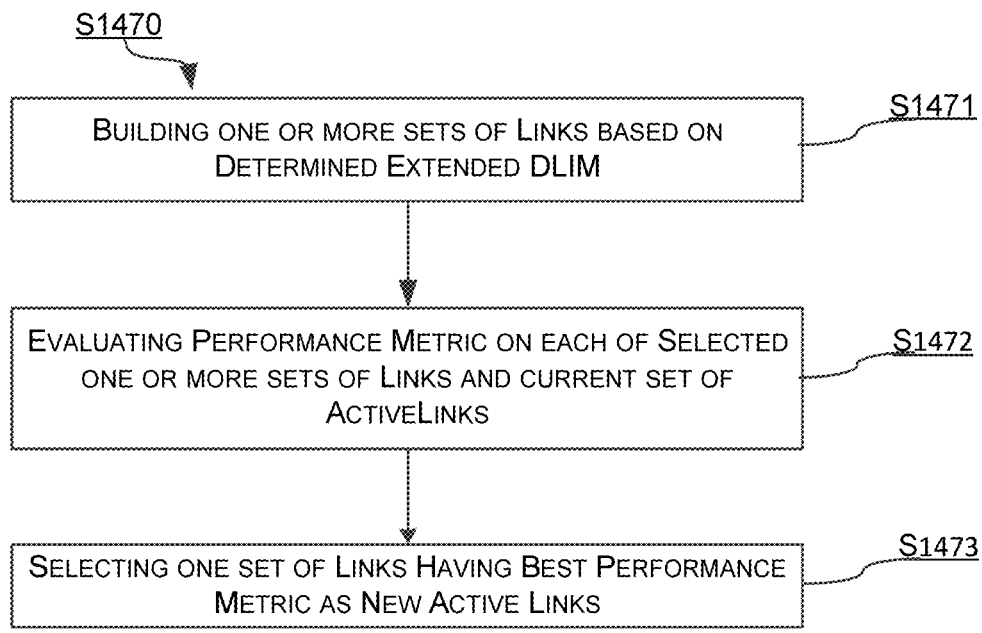
FIG. 16 shows a detailed implementation of step S1470 according to the present disclosure.

Step S1470 may optionally include steps S1471, S1472 and S1473 as illustrated in FIG. 16.

At step S1471, the control node builds one or more sets of links based on the determined extended DLIM. One of the one or more sets of links have possibilities to be used for replacing a current set of active links, e.g., links denoted as solid lines with arrowheads in FIG. 15. At step S1472, the control node evaluates a performance metric on each of the selected one or more sets of links and the current set of active links. At step S1473, the control node selects one set of links having the best performance metric as new active links. Greedy Rule may be used for selecting the new active links. There are various examples available for selecting the new active links by utilizing Greedy Rule. Greedy Rule is mainly embodied at step S1471. Several exemplary implementations will be described for illustration. It would be appreciated that the present disclosure is not limited thereto.

In an implementation, step S1471 may be implemented by replacing one or more active links among the current set of active links with one or more candidate links to build one set of the one or more sets of links. Taking the scenario as shown in FIG. 15 as an example, the current set of active links are denoted in solid lines with arrowheads. Then, one or more of active links among such a set may be replaced by one or more candidate links (denoted in dash dot lines with arrowheads) to build one set of the one or more sets of links. For example, the active link from UE2 to AP2 may be replaced with either the candidate link from UE2 to AP3 or the candidate link from UE2 to AP4. As a further example, the active link from AP3 to UE4 may be replaced by the candidate link from AP4 to UE4.

In another implementation, step S1471 may be implemented by removing one or more active links from the current set of active links to build one set of the one or more sets of links. In the scenario as shown in FIG. 15, one or more of active links may be removed from the current set of active links to build one set of the one or more sets of links. For example, the active link from AP1 to UE1 may be removed.

In yet another implementation, step S1471 may be implemented by adding one or more candidate links into the current set of active links to build one set of the one or more sets of links.

There are various examples for the performance metric, some of which will be described for illustration. It would be appreciated that the present disclosure is not limited thereto.

As an example, the performance metric may be a link's SINR. In this example, the control node may estimate SINR of each of the selected one or more sets of links and the current set of active links, and then select one combination that maximizes (one or a set of) link's SINR.

As another example, the performance metric may be a link's capacity. In such an example, the control node may estimate capacity (Shannon's or with knowledge of MCS selection) of each of the selected one or more sets of links and the current set of active links, and then select one combination that maximizes (one or a set of) link's capacity.

As a further example, the evaluating at step S1472 may be implemented by averaging each concerned link's performance metric, e.g., linearizing, or log-averaging, or applying certain fairness criterion such as Alpha-fairness, min-max, on each concerned link's performance metric, etc.

Alternatively, Step S1470 may be implemented depending on the number of client radio nodes severed by one server radio node at the same time. As well known, it is possible that one radio node can serve more than one client radio nodes at the same time. In such a case, these client radio nodes will have to share resources, which may result in the lower individual throughput. In consideration of this, the number of client radio nodes served by one server radio node at the same time may be considered in Step S1470. That is, the new active link may be selected by trying to spread links as much as possible among available server radio nodes, so as to ensure that the total number of active links that can actually transfer data at the same time is the highest. For example, if a server radio node serves two client radio nodes at the same time while another server radio node serves no client radio node, then it might be more efficient that each server radio node serves one client radio node, so that two links could transfer data simultaneously without sharing resources of one single server radio node. The new link formed in this way may be selected as the new active link.

Figure 17:
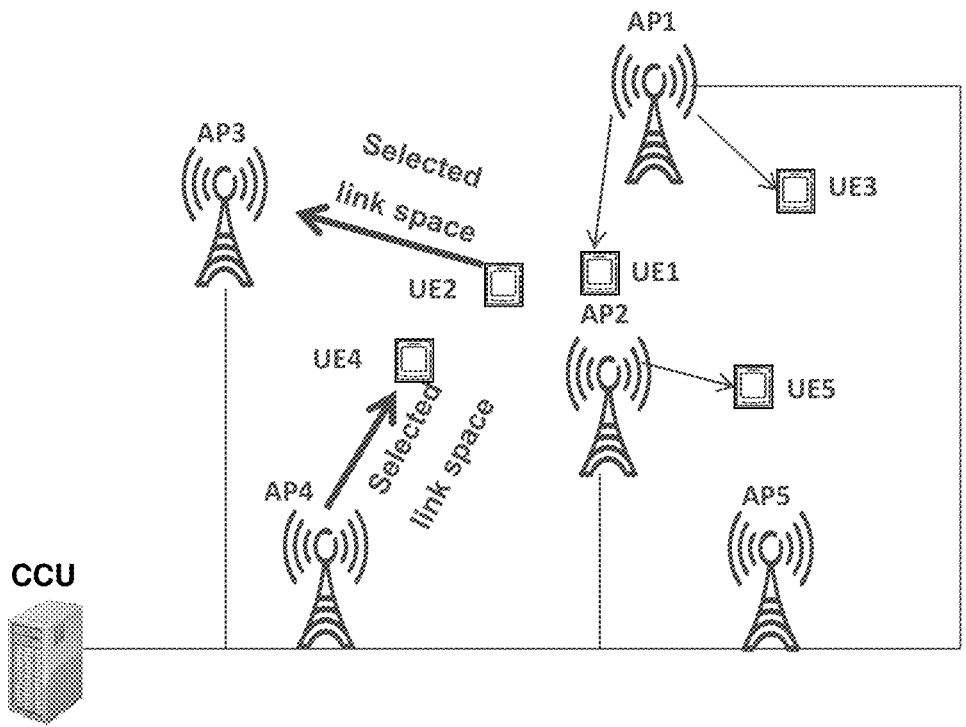
FIG. 17 shows a schematic diagram illustrating an exemplary link arrangement as a result of step S1470 according to the present disclosure

FIG. 17 shows a schematic diagram illustrating an exemplary link arrangement as a result of step S1470 according to the present disclosure.

As shown in FIG. 17, the candidate link from UE2 to AP3 and the candidate link from AP4 to UE4 are selected for replacing the active link from UE2 to AP2 and the active link from AP3 to UE4, respectively.

One major advantage with the method 1400 and its various variants is receiving nodes of all links (including not only active links but also respective candidate links) may be in a directional sensing state when the transmitting nodes of the all links are sending directional sounding signals. This can result in an extended DLIM, which can be used for providing a better link arrangement, e.g., illustrated in FIG. 17. With such an extended DLIM, the present disclosure can efficiently achieve spatial reuse benefit inherited from high gain beamforming.

Figure 18:
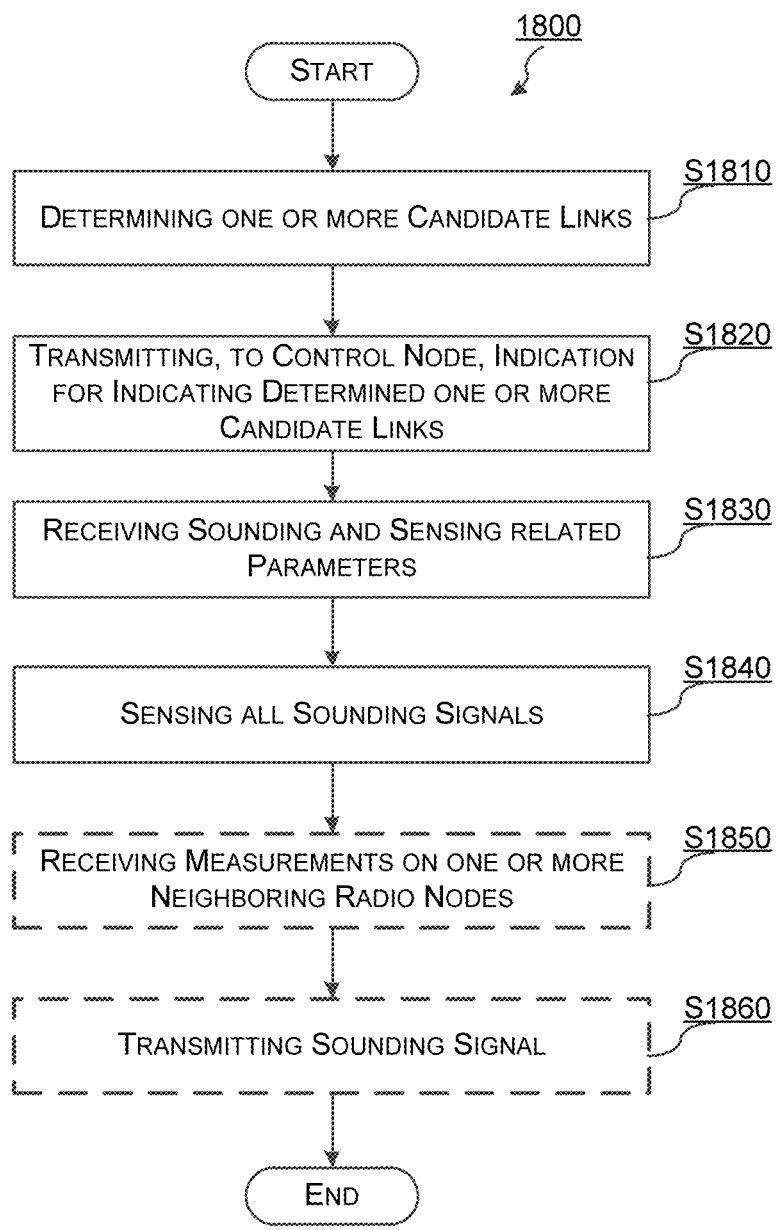
FIG. 18 shows a flowchart of a method 1800 used in a radio node under control of a control node according to embodiments of the present disclosure.

FIG. 18 shows a flowchart of a method 1800 used in a radio node under control of a control node, e.g., e.g., CCU 600 in FIG. 6, according to embodiments of the present disclosure. The radio node serves at least one client radio node. That is, the radio node here refers to a server radio node of its corresponding client radio nodes. The server radio node may be, e.g., any AN as depicted in FIG. 6. For example, if a client radio node is UE 660, then the server radio node is AP 620. It is also possible that a UE may play a role of a server radio node when the UE serves as a hot point and serves other UEs. In this case, the server radio node is the UE, and client radio nodes may be other UEs served by the UE. To put it differently, the server radio node here may be either a transmitting node or a receiving node of a link, either an active link or a candidate link.

At step S1810, the server radio node determines one or more candidate links between the client radio node and another radio nodes, e.g., candidate links as shown in FIG. 15. The server radio node may determine the one or more candidate links based on, e.g., a position of the client radio node. For example, if a server radio node knows locations in space (e.g., using a Global Position System (GPS)) of the client radio node and neighboring server radio nodes, it can determine distances between the client radio node and neighboring server radio nodes which could provide candidate link(s). Alternatively, the client radio node may report an estimated direction/distance between itself and neighboring server radio nodes to the server radio node, which in turn determines a set of suitable candidate link(s). A threshold may be applied on the distance to avoid radio nodes located too far.

It is also possible for the server radio node to determine the candidate links by applying spatial diversity (e.g., angular diversity) to limit interference in a beamforming system. Taking the layout as illustrated FIG. 13 for illustration and assuming there is no active link between UE2 and AP2, if it is to select two candidate links for UE2, it is to make a selection among AP2, AP3, AP4 and AP5 for forming candidate links with UE2. As illustrated in FIG. 13, links (UE2 to AP2) and (UE2 to AP5) are closely related in space, and thus they will be similarly interfered by the link (AP1 to UE1). In view of this, as an example, links (UE2 to AP2) and (UE2 to AP3) may be selected as two candidate links. This is because these two links have the best angular diversity (i.e., there is the maximum angle therebetween), and thereby the interference from the link (AP1 to UE1) will be received very differently for these two candidate links. It is also possible to select links (UE2 to AP2) and (UE2 to AP4) or links (UE2 to AP3) and (UE2 to AP4) as the two candidate links.

At step S1820, the server radio node transmits, to the control node, an indication for indicating the determined one or more candidate links.

Consequently, steps S1810 and S1820 form a variant of the method 1400 in terms of determining one or more candidate links. To be specific, with the method 1800, the one or more candidate links are determined at the server radio node side, while the method 1400 determines the one or more candidate links at the network side.

At step S1830, the server radio node receives, from the control node, sounding and sensing related parameters for each of the active link and the determined one or more candidate links. The received sounding and sensing related parameters include dedicated sounding and sensing related parameters for the link and common sounding and sensing related parameters for all of the determined one or more candidate links and all active links under control of the network. The common sounding and sensing related parameters include a sounding and sensing period and a sounding and sensing interval. This step may be performed in a similar manner with step S910 or S1110.

For example, the sounding and sensing related parameters may be illustrated by FIG. 10 and/or FIG. 12. Then, the sounding and sensing period may be denoted as DSSP and the sounding and sensing interval may be indicated by DSSI.

In an implementation, the dedicated sounding and sensing related parameters for each of the active link and the determined one or more candidate links comprise a sounding resource parameter for specifying a resource unit for the radio node transmitting the sounding signal, the specified resource unit being in terms of at least one or more of: time, frequency and code. For example, the specified resource unit here may be SRU as shown in FIG. 10 or FIG. 12.

In an implementation, the common sounding and sensing related parameters further include: a rule for the radio node reporting the one or more results of sensing sounding signals to the control node when the radio node serves as a receiving node of the link.

At step S1840, the server radio node senses, for each of the active link and the determined one or more candidate links, all sounding signals in a direction of the link based on the received sounding and sensing related parameters and reporting one or more sensing results to the control node, when the radio node serves as a receiving node of the link. This step may be performed in a similar manner with step S920.

The method 1800 may optionally include step S1850. At step S1850, the server radio node receives, from the client radio node, measurements on one or more neighboring radio nodes of the radio node. By using the received measurements, the server radio node may determine the one or more candidate links.

The method 1800 may optionally include step S1860. At step S1860, the server radio node transmits, for each of the active link and the determined one or more candidate links, a sounding signal in a direction of the link based on the sounding and sensing related parameters, when the radio node serves as a transmitting node of the link. This step may be performed in a similar manner with step S1120.

Figure 19:
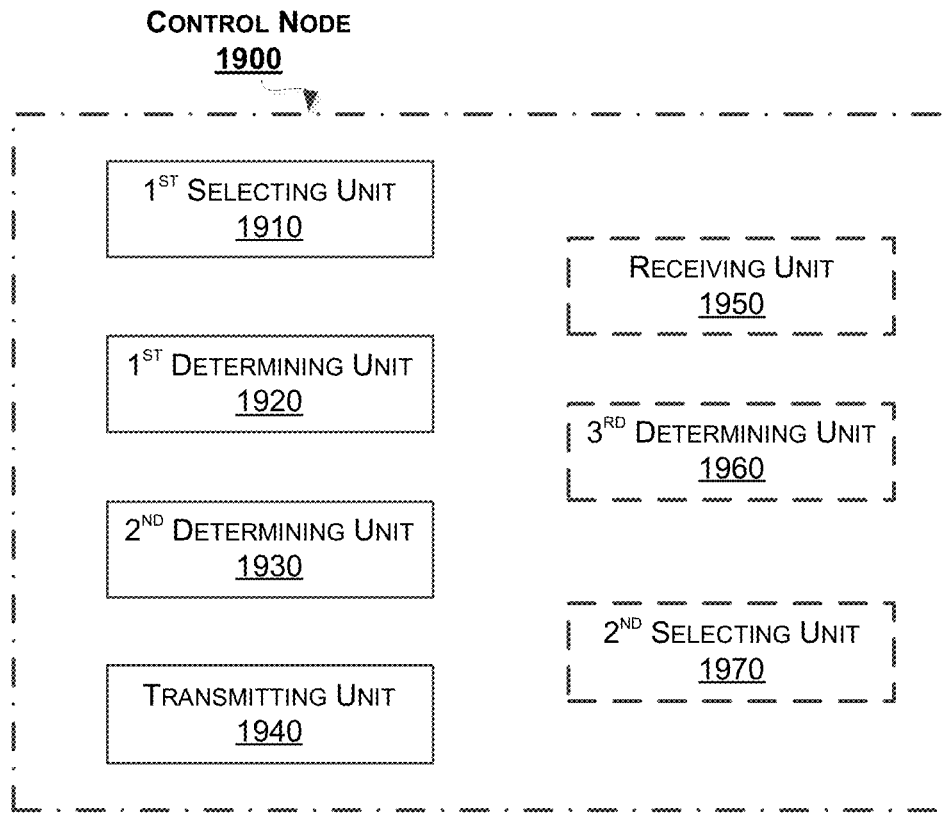
FIG. 19 is a schematic block diagram of a control node 1900 according to embodiments of the present disclosure.

FIG. 19 is a schematic block diagram of a control node 1900 according to embodiments of the present disclosure. The control node 1900 could be e.g. CCU 600 as shown in FIG. 6. Of course, the control node 1900 is not limited thereto, but may be other appropriate entities, which are responsible for parameter configurations and coordination among ANs as well as controlling radio links among ANs in any wireless system or cellular network.

As shown in FIG. 19, the control node 1900 includes a first selecting unit 1910, a first determining unit 1920, a second determining unit 1930, a transmitting unit 1940, a receiving unit 1950, a third determining unit 1960 and a second selecting unit 1970. The receiving unit 1950, the third determining unit 1960 and the second selecting unit 1970 are optional.

The first selecting unit 1910 is configured to select one or more client radio nodes based on a DLIM for all active links under control of the control node. Each of the one or more client radio nodes is served by a server radio node under control of the control node. There is an active link between each of the one or more client radio nodes and its server radio node. It should be noted that the DLIM here is intended for all active links under control of the control node. As an example, the DLIM here may be determined by the method 700 according to the present disclosure. For example, the DLIM may be the DLIM as illustrated in FIG. 13. In such an example, the control node (i.e., CCU as illustrated) may select any of client radios nodes such as UE1, UE2, UE3, UE4 or UE5 based on the interference situation identified by the DLIM.

In an implementation, the first selecting unit 1910 is further configured to select a first client radio node if an interference from an active link of the first client radio node to an active link of a second client radio node exceeds a first predetermined threshold.

In another implementation, the first selecting unit 1910 is further configured to select the first client radio node if a ratio between an interference strength from the active link of the first client radio node to a signal strength of the active link of the second client radio node exceeds a second predetermined threshold.

In yet another implementation, the first selecting unit 1910 is further configured to select the first client radio node if an interference from the active link of the first client radio node to the active link of the second client radio node exceeds a third predetermined threshold, and a radio quality of the active link of the second client radio node is lower than a fourth predetermined threshold.

In a further implementation, implementation, the first selecting unit 1910 is further configured to select a client radio node, if an experienced interference by an active link of the client radio node exceeds a fifth predetermined threshold.

In a further implementation, the first selecting unit 1910 is further configured to select a client radio node if a SNR or SINR of the active link of the client radio node falls below a sixth predetermined threshold.

In a further implementation, the first selecting unit 1910 is further configured to select the client radio node if the SNR or SINR of the active link of the client radio node falls below the sixth predetermined threshold and the experienced interference by the active link of the client radio node exceeds the fifth predetermined threshold.

In another implementation, the first selecting unit 1910 is further configured to receive a selection of a client radio node from its server radio node when traffic load of the server radio node exceeds a seventh predetermined threshold.

It should be noted that any of the first to the seventh thresholds may be preconfigured at the network side or at the radio node side.

In still another implementation, the first selecting unit 1910 is further configured to select a client radio node, if traffic load of a server radio node serving the client radio node exceeds traffic load of one neighboring radio node of the server radio node.

The first determining unit 1920 is configured to determine, for each of the selected one or more client radio nodes, one or more candidate links between the client radio node and other radio nodes, wherein the one or more candidate links are other than an active link between the client radio node and its server radio node and one of the one or more candidate links have possibilities to be established for replacing the active link. For example, as illustrated in FIG. 15, the first determining unit 1920 may determine two candidate links, i.e., a candidate link from UE2 to AP3 and a candidate link from UE2 to AP4, for replacing the active link from UE2 to AP2, and may determine one candidate link, i.e., a candidate link from AP4 to UE4, for replacing the active link from AP3 to UE4.

The second determining unit 1930 is configured to apply the extended ADSS for all active links and all the determined candidate links. To be specific, the second determining unit 1930 determines, for each of the determined candidate links and all active links under control of the control node, a set of sounding and sensing related parameters. The determined set of sounding and sensing related parameters includes a set of dedicated sounding and sensing related parameters for the link and a set of common sounding and sensing related parameters for all of the determined candidate links and all active links under control of the control node. The set of common sounding and sensing related parameters includes a sounding and sensing period and a sounding and sensing interval. For example, the sounding and sensing related parameters may be illustrated by FIG. 10 and/or FIG. 12. Then, the sounding and sensing period may be denoted as DSSP and the sounding and sensing interval may be indicated by DSSI.

In an implementation, the set of dedicated sounding and sensing related parameters for the link comprise a sounding resource parameter for specifying a resource unit for the transmitting node transmitting a sounding signal, the specified resource unit being in terms of at least one or more of:

time, frequency, and code. For example, the specified resource unit here may be SRU as shown in FIG. 10 or FIG. 12.

The transmitting unit 1940 is configured to transmit the determined set of sounding and sensing related parameters for each of the determined candidate links and all active links to a transmitting node and a receiving node of the link.

The receiving unit 1950 is configured to receive one or more results of sensing sounding signals from all receiving nodes of all of the determined candidate links and all active links under control of the control node.

The third determining unit 1960 is configured to determine an extended DLIM based on the received one or more sensing results.

The second selecting unit 1970 is configured to select, for one client radio node among the selected one or more client radio nodes, one new active link from corresponding one or more candidate links of the client radio node based on the determined extended DLIM.

Optionally, the second selecting unit 1970 is further configured to build one or more sets of links based on the determined extended DLIM. One of the one or more sets of links have possibilities to be used for replacing a current set of active links. Then, the second selecting unit 1970 is further configured to evaluate a performance metric on each of the selected one or more sets of links and the current set of active links, and select one set of links having the best performance metric as new active links, e.g., as illustrated in FIG. 17.

Greedy Rule may be used for selecting the new active links. There are various examples available for selecting the new active links by utilizing Greedy Rule. Several exemplary implementations will be described for illustration. It would be appreciated that the present disclosure is not limited thereto.

In an implementation, the second selecting unit 1970 may build one or more sets of links by replacing one or more active links among the current set of active links with one or more candidate links to build one set of the one or more sets of links. Taking the scenario as shown in FIG. 15 as an example, the current set of active links are denoted in solid lines with arrowheads. Then, one or more of active links among such a set may be replaced by one or more candidate links (denoted in dash dot lines with arrowheads) to build one set of the one or more sets of links. For example, the active link from UE2 to AP2 may be replaced with either the candidate link from UE2 to AP3 or the candidate link from UE2 to AP4. As a further example, the active link from AP3 to UE4 may be replaced by the candidate link from AP4 to UE4.

In another implementation, the second selecting unit 1970 may build one or more sets of links by removing one or more active links from the current set of active links to build one set of the one or more sets of links. In the scenario as shown in FIG. 15, one or more of active links may be removed from the current set of active links to build one set of the one or more sets of links. For example, the active link from AP1 to UE1 may be removed.

In yet another implementation, the second selecting unit 1970 may build one or more sets of links by adding one or more candidate links into the current set of active links to build one set of the one or more sets of links.

It should be noted that two or more different units in this disclosure may be logically or physically combined. For example, the first, second and third determining units may be combined as one single unit. Also, the first and second selecting units may be combined as one single unit.

Figure 20:
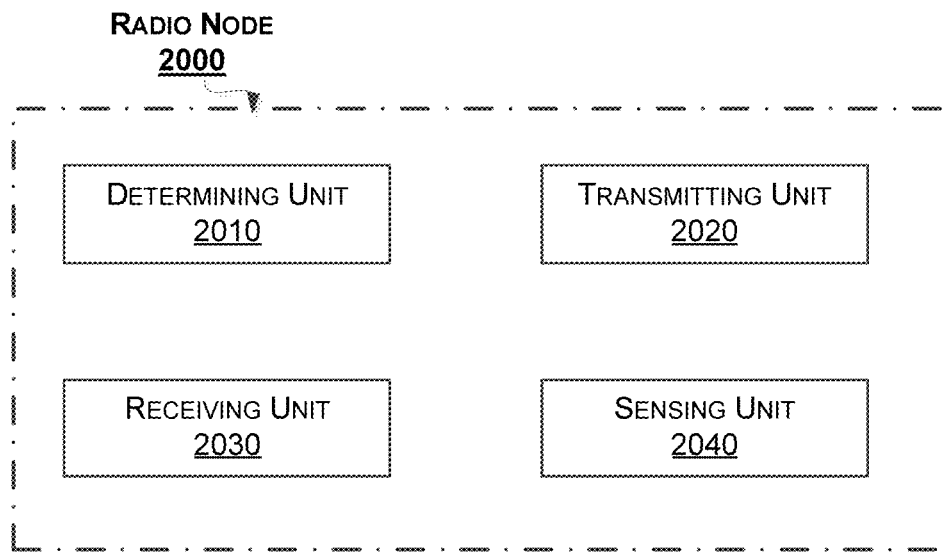
FIG. 20 is a schematic block diagram of a radio node 2000 under control of a control node, according to embodiments of the present disclosure.

FIG. 20 is a schematic block diagram of a radio node 2000 under control of a control node, e.g., e.g., CCU 600 in FIG. 6, according to embodiments of the present disclosure. The radio node 2000 serves a client radio node. That is, the radio node 2000 here refers to a server radio node of its corresponding client radio node. The radio node 2000 may be, e.g., any AN as depicted in FIG. 6. For example, if a client radio node is UE 660, then the radio node 2000 refers to AP 620. It is also possible that a UE may play a role of a server radio node when the UE serves as a hot point and serves other UEs. In this case, the radio node 2000 is the UE, and client radio nodes may be other UEs served by the UE. To put it differently, the radio node 2000 here may be either a transmitting node or a receiving node of a link, either an active link or a candidate link.

As shown in FIG. 20, the radio node 2000 includes a determining unit 2010, a transmitting unit 2020, a receiving unit 2030, and a sensing unit 2040.

The determining unit 2010 is configured to determine one or more candidate links between the client radio node and another radio nodes, e.g., candidate links as shown in FIG. 15. For example, the determining unit 2010 may determine the one or more candidate links based on a position of the client radio node.

The transmitting unit 2020 is configured to transmit, to the control node, an indication indicating the determined one or more candidate links.

The receiving unit 2030 is configured to receive, from the control node, sounding and sensing related parameters for each of the active link and the determined one or more candidate links. The received sounding and sensing related parameters include dedicated sounding and sensing related parameters for the link and common sounding and sensing related parameters for all of the determined one or more candidate links and all active links under control of the network. The common sounding and sensing related parameters include a sounding and sensing period and a sounding and sensing interval.

In an implementation, the dedicated sounding and sensing related parameters for each of the active link and the determined one or more candidate links comprise a sounding resource parameter for specifying a resource unit for the radio node transmitting the sounding signal, the specified resource unit being in terms of at least one or more of: time, frequency and code. For example, the specified resource unit here may be SRU as shown in FIG. 10 or FIG. 12.

In an implementation, the common sounding and sensing related parameters further include: a rule for the radio node reporting the one or more results of sensing sounding signals to the control node when the radio node serves as a receiving node of the link.

The sensing unit 2040 is configured to sense, for each of the active link and the determined one or more candidate links, all sounding signals in a direction of the link based on the received sounding and sensing related parameters and reporting one or more sensing results to the control node, when the radio node serves as a receiving node of the link.

Optionally, the receiving unit 2030 is further configured to receive, from the client radio node, measurements on one or more neighboring radio nodes of the radio node. By using the received measurements, the determining unit 2010 may determine the one or more candidate links.

Optionally, the transmitting unit 2020 is further configured to transmit, for each of the active link and the determined one or more candidate links, a sounding signal in a direction of the link based on the sounding and sensing related parameters, when the radio node serves as a transmitting node of the link.

It should be noted that two or more different units in this disclosure may be logically or physically combined. For example, the transmitting unit 2020 and the receiving unit 2030 may be combined as one single unit.

Figure 21:
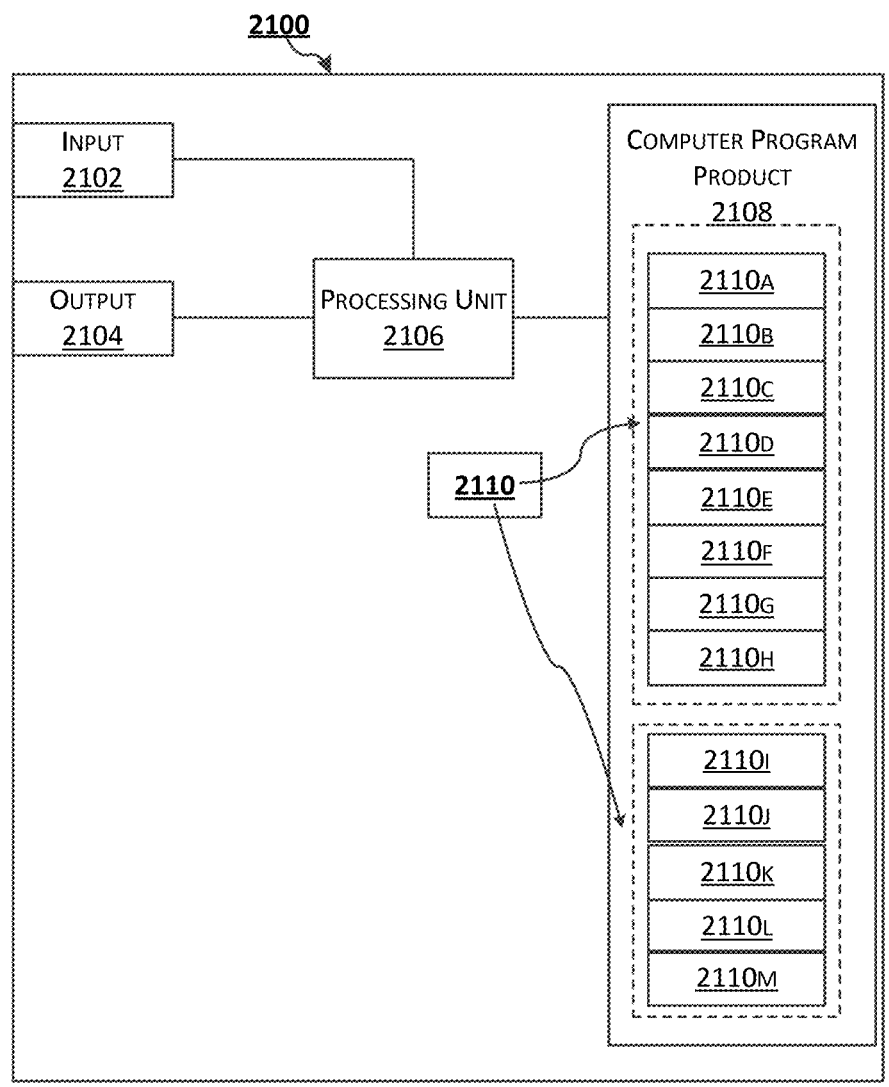
FIG. 21 schematically shows an embodiment of an arrangement 2100 which may be used in the control node 1900 or the radio node 2000 according to the present disclosure.

FIG. 21 schematically shows an embodiment of an arrangement 2100 which may be used in the control node 1900 or the radio node 2000 according to the present disclosure.

Comprised in the arrangement 2100 are here a processing unit 2106, e.g., with a Digital Signal Processor (DSP). The processing unit 2106 may be a single unit or a plurality of units to perform different actions of procedures described herein. The arrangement 2100 may also comprise an input unit 2102 for receiving signals from other entities, and an output unit 2104 for providing signal(s) to other entities. The input unit and the output unit may be arranged as an integrated entity or as illustrated in the example of FIG. 19 or FIG. 20.

Furthermore, the arrangement 2100 may comprise at least one computer program product 2108 in the form of a non-volatile or volatile memory, e.g., an Electrically Erasable Programmable Read-Only Memory (EEPROM), a flash memory and a hard drive. The computer program product 2108 comprises a computer program 2110, which comprises code/computer readable instructions, which when executed by the processing unit 2106 in the arrangement 2100 causes the arrangement 2100 and/or the server radio node or the control node in which it is comprised to perform the actions, e.g., of the procedure described earlier in conjunction with FIG. 14 or FIG. 18.

The computer program 2110 may be configured as a computer program code structured in computer program modules 2110A-2110H or 20101-2110M.

Hence, in an exemplifying embodiment when the arrangement 2100 is used in the radio node 2000, the code in the computer program of the arrangement 2100 includes a first selecting module 2110A, for selecting one or more client radio nodes based on a DLIM for all active links under control of the control node. Each of the one or more client radio nodes is served by a server radio node under control of the control node. The code in the computer program 2110 further includes a first determining module 2110B, for determining, for each of the selected one or more client radio nodes, one or more candidate links between the client radio node and other radio nodes. The code in the computer program 2110 further includes a second determining module 2110C, for determining, for each of the determined candidate links and all active links under control of the control node, a set of sounding and sensing related parameters. The code in the computer program 2110 further includes a transmitting module 2110D, for transmitting the determined set of sounding and sensing related parameters for each of the determined candidate links and all active links to a transmitting node and a receiving node of the link. Optionally, the code in the computer program 2110 further includes a receiving module 2110E, for receiving one or more results of sensing sounding signals from all receiving nodes of all of the determined candidate links and all active links under control of the control node. Optionally, the code in the computer program 2110 further includes a third determining module 2110F for determining an extended DLIM based on the received one or more sensing results. Optionally, the code in the computer program 2110 further includes a second selecting module 2110G for selecting, for one client radio node among the selected one or more client radio nodes, one new active link from corresponding one or more candidate links of the client radio node based on the determined extended DLIM. The code in the computer program 2110 may comprise further modules, illustrated as module 2110H, e.g. for controlling and performing other related procedures associated with the control node's operations. For example, when the radio node is a CCU, then the module 2110H may control and perform other related procedures associated with the CCU's operations.

In another exemplifying embodiment when the arrangement 2100 is used in the radio node 2000, the code in the computer program of the arrangement 2100 includes a determining module 2110I, for determining one or more candidate links between the client radio node and another radio nodes. The code in the computer program further includes a transmitting module 2110J, for transmitting, to the control node, an indication indicating the determined one or more candidate links. The code in the computer program further includes a receiving module 2110K, for receiving, from the control node, sounding and sensing related parameters for each of the active link and the determined one or more candidate links. The code in the computer program further includes a sensing module 2110L, for sensing, for each of the active link and the determined one or more candidate links, all sounding signals in a direction of the link based on the received sounding and sensing related parameters and reporting one or more sensing results to the control node, when the radio node serves as a receiving node of the link.

The code in the computer program 2110 may comprise further modules, illustrated as module 2110M, e.g. for controlling and performing other related procedures associated with the radio node's operations. For example, when the radio node is a BS, then the module 2110M may control and perform other related procedures associated with the BS's operations.

The computer program modules could essentially perform the actions of the flow illustrated in FIG. 14, to emulate the control node 1900, or the actions of the flow illustrated in FIG. 18, to emulate the radio node 2000. In other words, when the different computer program modules are executed in the processing unit 2106, they may correspond, e.g., to the units 1910-1970 of FIG. 19, or to the units 2010-2040 of FIG. 20.

Although the code means in the embodiments disclosed above in conjunction with FIG. 21 are implemented as computer program modules which when executed in the processing unit causes the arrangement to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the radio node or the control node.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method used in a control node, the method comprising:
    selecting one or more client radio nodes based on a Directional Link Interference Map (DLIM) for active links under control of the control node, wherein each of the one or more client radio nodes is served by a server radio node under control of the control node, wherein the DLIM identifies directional links that contribute interference to the active links and interference levels of the directional links;
    for each of the selected one or more client radio nodes, determining one or more candidate links other than an active link between the client radio node and its server radio node for replacing the active link, wherein each candidate link is between the client radio node and another radio node other than the server radio node;
    for each of the determined candidate links and active links,
        determining a set of sounding and sensing related parameters, wherein the set of sounding and sensing related parameters for a link includes a set of dedicated sounding and sensing related parameters for the link and a set of common sounding and sensing related parameters for the determined candidate links and active links, and wherein the set of common sounding and sensing related parameters includes a sounding and sensing period and a sounding and sensing interval; and
        transmitting the determined set of sounding and sensing related parameters to a transmitting node and a receiving node of the respective link.

2. The method of claim 1, wherein the set of dedicated sounding and sensing related parameters for the link comprises a sounding resource parameter for specifying a resource unit for the transmitting node transmitting a sounding signal, the specified resource unit being in terms of at least one or more of: time, frequency, and code.

3. The method of claim 1, wherein the set of common sounding and sensing related parameters includes a rule for the receiving node reporting, to the control node, its result of sensing sounding signals.

4. The method of claim 1, wherein selecting the one or more client radio nodes based on the DLIM for the active links comprises at least one of:
    selecting a first client radio node if an interference from an active link of the first client radio node to an active link of a second client radio node exceeds a first predetermined threshold;
    selecting the first client radio node if a ratio between an interference strength from the active link of the first client radio node to a signal strength of the active link of the second client radio node exceeds a second predetermined threshold; and
    selecting the first client radio node if an interference from the active link of the first client radio node to the active link of the second client radio node exceeds a third predetermined threshold, and a radio quality of the active link of the second client radio node is lower than a fourth predetermined threshold.

5. The method of claim 1, wherein selecting the one or more client radio nodes based on the DLIM for the active links comprises at least one of:
    selecting a client radio node, if an experienced interference by an active link of the client radio node exceeds a fifth predetermined threshold;
    selecting a client radio node if a signal-to-noise ratio (SNR) or signal-to-interference-plus-noise ratio (SINR) of the active link of the client radio node falls below a sixth predetermined threshold; and
    selecting the client radio node if the SNR or SINR of the active link of the client radio node falls below the sixth predetermined threshold and the experienced interference by the active link of the client radio node exceeds the fifth predetermined threshold.

6. The method of claim 1, wherein selecting the one or more client radio nodes based on the DLIM for the active links comprises at least one of:
    receiving a selection of a client radio node from its server radio node when traffic load of the server radio node exceeds a seventh predetermined threshold; and
    selecting a client radio node, if traffic load of a server radio node serving the client radio node exceeds traffic load of one neighboring radio node of the server radio node.

7. The method of claim 1, further comprising:
    receiving one or more results of sensing sounding signals from all receiving nodes of the determined candidate links and active links;
    determining an extended DLIM based on the received one or more results; and
    for one client radio node among the selected one or more client radio nodes, selecting one new active link from corresponding one or more candidate links of the client radio node based on the determined extended DLIM.

8. The method of claim 7, wherein selecting the one new active link comprises:
    building one or more sets of links based on the determined extended DLIM, one of the one or more sets of links have possibilities to be used for replacing a current set of active links;
    evaluating a performance metric on each of the one or more sets of links and the current set of active links; and
    selecting one set of links having the best performance metric as new active links.

9. A control node, comprising:
    a processor and non-transitory computer readable medium storing instructions, which when executed by the processor, cause the control node to perform:
        selecting one or more client radio nodes based on a Directional Link Interference Map (DLIM) for active links under control of the control node, wherein each of the one or more client radio nodes is served by a server radio node under control of the control node, wherein the DLIM identifies directional links that contribute interference to the active links and interference levels of the directional links;
        for each of the selected one or more client radio nodes, determining one or more candidate links other than an active link between the client radio node and its server radio node for replacing the active link, wherein each candidate link is between the client radio node and another radio node other than the server radio node;

for each of the determined candidate links and active links, determining a set of sounding and sensing related parameters, wherein the set of sounding and sensing related parameters for a link includes a set of dedicated sounding and sensing related parameters for the link and a set of common sounding and sensing related parameters for the determined candidate links and active links, and wherein the set of common sounding and sensing related parameters includes a sounding and sensing period and a sounding and sensing interval; and transmitting the determined set of sounding and sensing related parameters to a transmitting node and a receiving node of the respective link.

10. The control node of claim 9, wherein the control node is further to perform:

receiving one or more results of sensing sounding signals from all receiving nodes of the determined candidate links and active links under control of the control node;

determining an extended DLIM based on the received one or more results; and for one client radio node among the selected one or more client radio nodes, selecting one new active link from corresponding one or more candidate links of the client radio node based on the determined extended DLIM.

11. The control node of claim 10, wherein selecting the one new active link comprises:

building one or more sets of links based on the determined extended DLIM, one of the one or more sets of links have possibilities to be used for replacing a current set of active links;

evaluating a performance metric on each of the one or more sets of links and the current set of active links; and selecting one set of links having the best performance metric as new active links.

12. A non-transitory computer readable medium storing instructions, which when executed by a processor, cause a control node to perform:

selecting one or more client radio nodes based on a Directional Link Interference Map (DLIM) for active links under control of a control node, wherein each of the one or more client radio nodes is served by a server radio node under control of the control node, wherein the DLIM identifies directional links that contribute interference to the active links and interference levels of the directional links;

for each of the selected one or more client radio nodes, determining one or more candidate links other than an active link between the client radio node and its server radio node for replacing the active link, wherein each candidate link is between the client radio node and another radio node other than the server radio node;

for each of the determined candidate links and active links, determining a set of sounding and sensing related parameters, wherein the set of sounding and sensing related parameters for a link includes a set of dedicated sounding and sensing related parameters for the link and a set of common sounding and sensing related parameters for the determined candidate links and active links, and wherein the set of common sounding and sensing related parameters includes a sounding and sensing period and a sounding and sensing interval; and transmitting the determined set of sounding and sensing related parameters to a transmitting node and a receiving node of the respective link.

13. The non-transitory computer readable medium of claim 12, wherein the set of common sounding and sensing related parameters includes a rule for the receiving node reporting, to the control node, its result of sensing sounding signals.

14. The non-transitory computer readable medium of claim 12, wherein selecting the one or more client radio nodes based on the DLIM for the active links comprises at least one of:

selecting a first client radio node if an interference from an active link of the first client radio node to an active link of a second client radio node exceeds a first predetermined threshold;

selecting the first client radio node if a ratio between an interference strength from the active link of the first client radio node to a signal strength of the active link of the second client radio node exceeds a second predetermined threshold; and selecting the first client radio node if an interference from the active link of the first client radio node to the active link of the second client radio node exceeds a third predetermined threshold, and a radio quality of the active link of the second client radio node is lower than a fourth predetermined threshold.

15. The non-transitory computer readable medium of claim 12, wherein selecting the one or more client radio nodes based on the DLIM for the active links comprises at least one of:

selecting a client radio node, if an experienced interference by an active link of the client radio node exceeds a fifth predetermined threshold;

selecting a client radio node if a signal-to-noise ratio (SNR) or signal-to-interference-plus-noise ratio (SINR) of the active link of the client radio node falls below a sixth predetermined threshold; and selecting the client radio node if the SNR or SINR of the active link of the client radio node falls below the sixth predetermined threshold and the experienced interference by the active link of the client radio node exceeds the fifth predetermined threshold.

16. The non-transitory computer readable medium of claim 12, wherein selecting the one or more client radio nodes based on the DLIM for the active links comprises at least one of:

receiving a selection of a client radio node from its server radio node when traffic load of the server radio node exceeds a seventh predetermined threshold; and selecting a client radio node, if traffic load of a server radio node serving the client radio node exceeds traffic load of one neighboring radio node of the server radio node.

* * * * *